(12) United States Patent
Takakuwa et al.

(10) Patent No.: US 7,742,683 B2
(45) Date of Patent: Jun. 22, 2010

(54) INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, COMPUTER PROGRAM FOR CONTROLLING RECORDING OR REPRODUCTION, AND DATA STRUCTURE CONTAINING CONTROL SIGNAL

(75) Inventors: Nobuyuki Takakuwa, Saitama (JP); Yasuko Fukuda, Saitama (JP); Takao Sawabe, Saitama (JP); Tohru Kanegae, Saitama (JP); Masanori Nakahara, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 856 days.

(21) Appl. No.: 10/542,754

(22) PCT Filed: Jan. 20, 2004

(86) PCT No.: PCT/JP2004/000405

§ 371 (c)(1),
(2), (4) Date: Jun. 12, 2006

(87) PCT Pub. No.: WO2004/066303

PCT Pub. Date: Aug. 5, 2004

(65) Prior Publication Data

US 2006/0256701 A1 Nov. 16, 2006

(30) Foreign Application Priority Data

Jan. 20, 2003 (JP) ............................. 2003-011606

(51) Int. Cl.
*H04N 7/00* (2006.01)
*H04N 5/91* (2006.01)
*H04N 7/26* (2006.01)
*H04N 5/00* (2006.01)

(52) U.S. Cl. ............................. 386/96; 386/46; 386/95; 386/124; 386/125; 386/126

(58) Field of Classification Search ...................... 386/1, 386/46, 95, 96, 124–126
See application file for complete search history.

(56) References Cited

U.S. PATENT DOCUMENTS 7,289,722 B2 * 10/2007 Murase et al. ................. 386/99

FOREIGN PATENT DOCUMENTS

| JP | 2000-348442 | 12/2000 |
| JP | 2002-197783 | 7/2002 |
| JP | 2003-132628 | 5/2003 |

* cited by examiner

*Primary Examiner*—Marsha D Banks Harold
*Assistant Examiner*—Marc Dazenski
(74) *Attorney, Agent, or Firm*—Young & Thompson

(57) ABSTRACT

An information recording medium includes a file for storing object data consisting of a plurality of packets and a file for storing, as its reproduction control information, (i) correspondence definition information for defining relationship between a plurality of packets and a plurality of partial streams multiplexed on the time axis and (ii) reproduction output group definition information for defining as the reproduction output group a set of partial streams which can be switched among the plurality of partial streams. The partial streams include a plurality of channel streams wherein audio information on plural channels is recorded in one stream. The reproduction output group definition information defines the reproduction output group in such a way that a plurality of channel streams can redundantly belong to it. The reproduction output group to which plural channel streams redundantly belong is added by channel specification information.

18 Claims, 24 Drawing Sheets

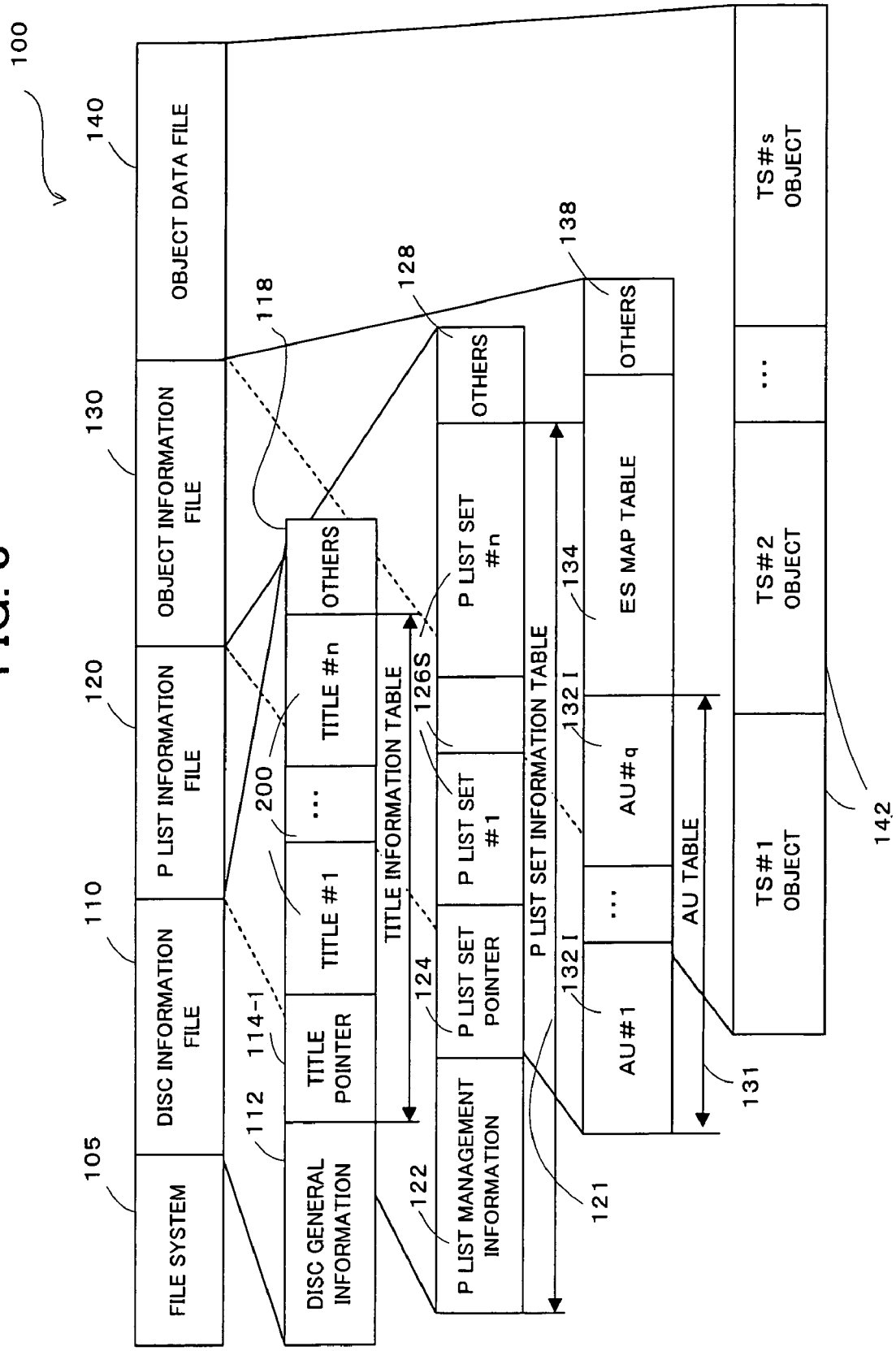

FIG. 21

AU TABLE: 131

| Field Name | | | Contents |
|---|---|---|---|
| AU Table General Information | | | the Number of AUs, Pointer to each AU, etc. |
| ... | | | ... |
| AU Table | AU#2 | AU Attribute Information | the Number of PU, etc. |
| | | PU#1 — PU Attribute Information | the Number of ES, etc. |
| | 1321 | ES_Table Index#1 | ES_Map table Index #1 (Video) |
| | | ES_Table Index#2 | ES_Map table Index #2 (Audio) |
| | | ES_Table Index#3 | ES_Map table Index #6 (Sub-picture) |
| | 3021 | PU#2 — PU Attribute Information | the Number of ES, etc. |
| | | ES_Table Index#1 | ES_Map table Index #1 (Video) |
| | | ES_Table Index#2 | ES_Map table Index #3 (Audio) |
| | | ES_Table Index#3 | ES_Map table Index #6 (Sub-picture) |
| | | PU#3 — PU Attribute Information | the Number of ES, etc. |
| | | ES_Table Index#1 | ES_Map table Index #1 (Video) |
| | | ES_Table Index#2 | ES_Map table Index #4 (Audio) |
| | | ES_Table Index#3 | ES_Map table Index #6 (Sub-picture) |
| | | PU#4 — PU Attribute Information | the Number of ES, etc. |
| | | ES_Table Index#1 | ES_Map table Index #1 (Video) |
| | | ES_Table Index#2 | ES_Map table Index #5 (Audio) |
| | | ES_Table Index#3 | ES_Map table Index #6 (Sub-picture) |
| | ... | | ... |
| Other Information | | | ES_Map table Position, etc. |

ES MAP TABLE: 134

| Field Name名 | | Contents | |
|---|---|---|---|
| ES_Map Table | ES_map table General Information | the Number of Index, etc. | |
| | Index #1 | ES_PID Value=10 | } Video |
| | | Address Information | |
| | Index #2 | ES_PID=20 | } Audio |
| | | Available Channel Data (=CH0) | |
| | | Address Information | |
| | Index #3 | ES_PID=20 | |
| | | Available Channel Data (=CH1) | |
| | | Address Information | |
| | Index #4 | ES_PID=20 | |
| | | Available Channel Data (=CH0&CH1) | |
| | | Address Information | |
| | Index #5 | ES_PID=21 | |
| | | Address Information | |
| | Index #6 | ES_PID=31 | } Sub-picture |
| | | Address Information | |
| | Other Information | Other Information | |

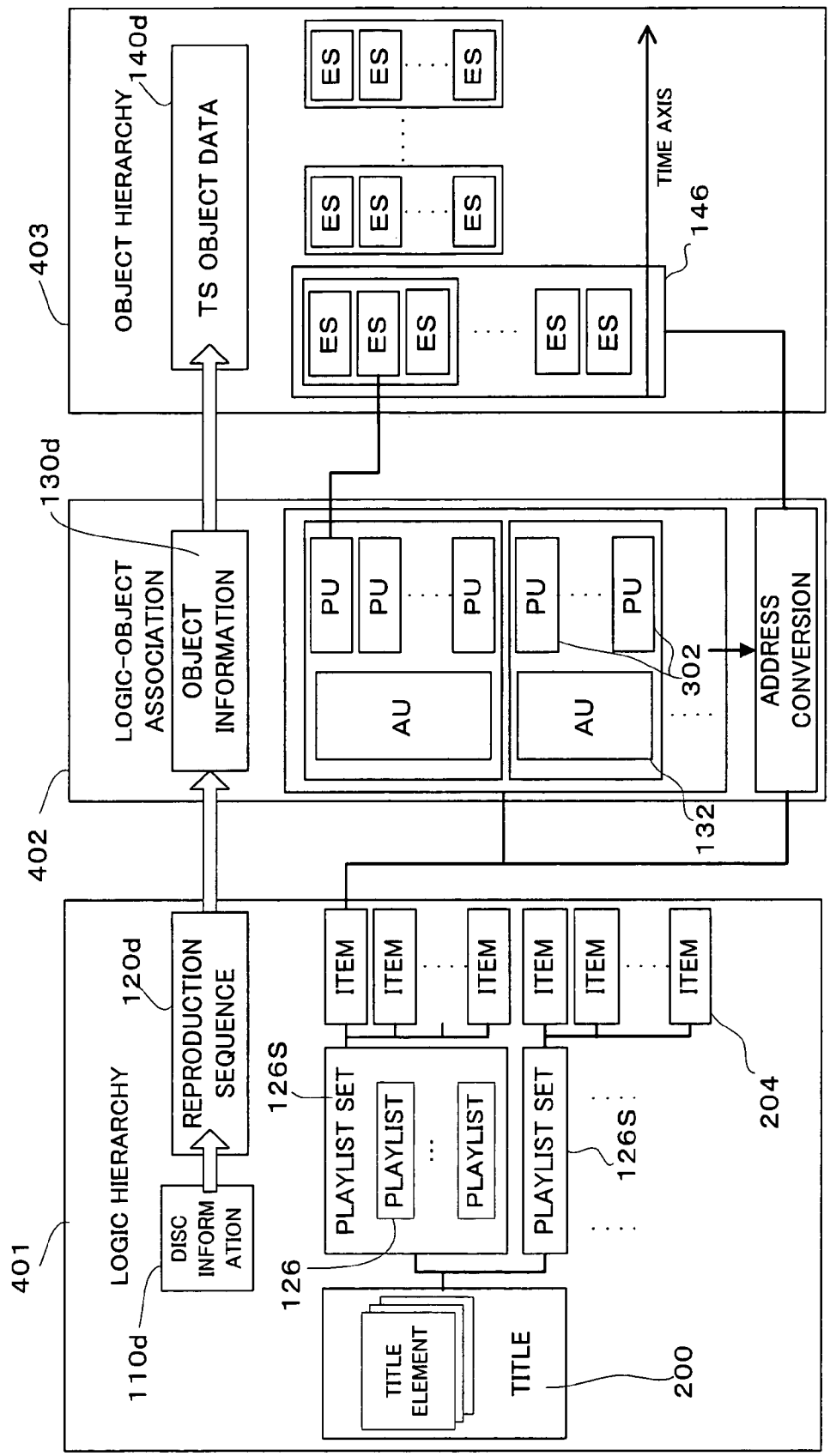

INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, COMPUTER PROGRAM FOR CONTROLLING RECORDING OR REPRODUCTION, AND DATA STRUCTURE CONTAINING CONTROL SIGNAL

TECHNICAL FIELD

The present invention relates to: an information record medium, such as a high density optical disc, capable of recording various information such as main picture information or video information, audio information, sub-picture information, reproduction control information, and so on, at high density; an apparatus for and a method of recording the information onto the information record medium; an apparatus for and a method of reproducing the information from the information record medium; an apparatus and a method capable of both recording and reproducing the information; a computer program for controlling the recording or reproduction; and a data structure including a control signal for controlling the reproduction.

BACKGROUND ART

DVDs become common as optical discs onto which various information such as video information (i.e. main picture information), audio information, sub-picture information, reproduction control information and so on is recorded. According to a DVD standard, the video information (video data), the audio information (audio data) and the sub-picture information (sub-picture data) are packetized each with the reproduction control information (navigation data) and multi-recorded onto a disc in a program stream format of MPEG 2 (Moving Picture Experts Group phase 2), which is a high performance encoding technology. Among them, the video information has data, which is compressed in a MPEG video format (ISO 13818-2), for one stream in one program stream. On the other hand, the audio information is recorded in a plurality of formats (i.e. linear PCM, AC-3, MPEG audio and so on) and has data for up to 8 streams in one program stream. The sub-picture information is defined by a bitmap, and is compressed and recorded in a run length method, and has data for up to 32 streams in one program stream. In the case of the DVD, as described above, a plurality of streams of the selectable audio information (e.g. streams of a stereo sound, a surrounding sound, an original English sound, a dubbed Japanese sound, and the like) and a plurality of streams of the selectable sub-picture information (e.g. streams of Japanese caption, English caption, and the like) are multiplexed and recorded in the program stream format, for one stream of the video information in one movie or film, for example.

On the other hand, a transport stream of MPEG2 standard is coming to be standardized, which is suitable for a data transfer with higher speed and higher volume. According to the transport stream format, a plurality of elementary streams is transferred at the same time, with a far higher transfer rate compared to the program stream format. For example, a plurality of programs, such as a plurality of satellite digital broadcasting channels in one satellite radio wave, is transmitted at the same time in a TDM (Time Division Multiplex) scheme. That is, in the transport stream format, a plurality of videos each having a great amount of data can be multiplexed in the TDM scheme and transferred at the same time. For example, a plurality of movies to be recorded onto a plurality of DVD's or the like can be transferred at the same time.

On the other hand, the audio information in a dual mono format is broadly used in a field of TV broadcasting. The audio information in the dual mono scheme may be information in which Japanese sound as the main audio and English sound as the sub-audio are streamed into one stream, which may be transferred or recorded usually as one signal. Therefore, also as for DVD's, the audio stream in the dual mono format may exist, in addition to the linear PCM or the like, as one of audio streams mentioned above, in the program stream.

DISCLOSURE OF INVENTION

Also with regard to the aforementioned audio stream in the dual mono format, it will be convenient that the main audio and the sub-audio are separately or independently reproduced and outputted from one stream. For example, it will be convenient that only Japanese sound or only English sound is reproduced and outputted from one stream, which is achieved in a field of conventional TV receivers, video recorders, or the like.

In the aforementioned DVD's, a plurality of audio streams including audio stream in the linear PCM format, audio stream in a AC-3 format, audio stream in the MPEG audio format, audio stream in the dual mono format and so on allows only an extraction of each entire stream. However, there is a technical problem that but the plurality of audio streams including audio streams in the linear PCM format and so on does not allow an extraction of only main audio or only sub-audio from the dual mono audio stream streamed into one stream. That is, there is a technical problem that a switching among the main audio and the sub-audio in the dual mono audio stream as one stream (hereinafter, this switching may be referred to as an "in-stream audio switching") cannot be performed, although a switching among a plurality of streams (hereinafter this switching may be referred to as a "stream switching") can be performed, if audio streams are recorded in various formats.

It is considered that this technical problem is occurred because of some reasons which cannot be solved easily, for example one reason that two kinds of switching including the stream switching and the in-stream audio switching in the one player are technically difficult, or another reason that a user's operation becomes complex even if two kinds of switching can be achieved, or other reasons.

The present invention has been accomplished in view of the above problems. It is therefore an object of the present invention to provide an information record medium, an information record apparatus and method, an information reproduction apparatus and method, an information record reproduction apparatus and method, a computer program for a record or reproduction control, and a data structure including a control signal for a reproduction control, for example, for allowing, during a reproduction, not only the stream switching among a plurality of audio streams including a plural-channels stream having a plurality of channels such as the dual mono audio stream but also the in-stream audio switching in the plural-channels stream, while a relatively simple construction is achieved.

Hereinafter, the information record medium, the information record apparatus and method, the information reproduction apparatus and method, the information record reproduction apparatus and method, and the computer program according to the present invention will be discussed, in this order.

(Information Record Medium)

The information record medium according to the present invention is an information record medium onto which a whole stream including a plurality of partial streams each composed of video information or audio information is multi-recorded by a packet unit that is a physically accessible unit, the video information or the audio information providing a series of content, the information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively by the group, as a reproduction output group, wherein the plurality of partial streams includes a plural-channels stream that is composed by recording the audio information for a plurality of channels in one partial stream, and the reproduction output group definition information includes channel designation information to designate at least one channel from among the plurality of channels.

For example, the reproduction output definition information defines the reproduction output group in such a manner that the plural-channels stream belongs to a plurality of aforementioned reproduction output groups, overlappingly. With regard to the plurality of reproduction output groups to which the plural-channels stream belongs overlappingly, the channel designation information to designate at least one channel from among the plurality of channels is added to the relationship definition information in such a manner that the content of the designation information differ among the plurality of reproduction output groups.

According to the information record medium of the present invention, the whole stream like as at least a part of the transport stream in a MPEG2 or MPEG4 format includes a plurality of partial streams like as elementary streams. Each partial stream is composed of the video information or the audio information providing a series of content reproducible by the information reproduction apparatus, such as the video information (video data), the audio information (audio data), and the sub-picture information (sub-picture data). That is, one "partial stream" herein means one data array or information array, such as an elementary stream including a video stream, an audio stream, a sub-picture stream or the like providing a series of content. On the other hand, one "whole stream" herein means a data array or information array in which a plurality of partial streams is bundled. The whole stream may be a transport stream itself bundling "m" (m is natural number equal to or more than 2) elementary streams in the MPEG2 or MPEG4 format, or may be a data array or information array bundling "n" (n is natural number equal to or more than 2 and less than "m") elementary streams thereamong. Such a whole stream is multi-recorded onto the information record medium, by a packet unit (e.g. a TS packet as mentioned below) that is a physically accessible unit by the information reproduction apparatus. Particularly, the object data file stores the object data composed of the plurality of packets each storing pieces of the content information and being the logically accessible unit by the information reproduction apparatus. The object information file stores the relationship definition information (e.g. an ES map table (ES_Map Table), as mentioned below, indicating an elementary stream packet ID (ES_PID)), as the reproduction control information to control the reproduction of the object data file by the information reproduction apparatus.

The object information file further stores the reproduction output group definition information (e.g. a PU (Presentation Unit) information as mentioned below) to define a group of partial streams from among the plurality of partial streams switchable to each other by the information reproduction apparatus, as the reproduction output group (e.g. a PU as mentioned below). The group of partial streams is reproduced and outputted collectively by the group. For example, one reproduction output group is composed of one video stream, one audio stream and one sub-picture stream. For example, however, one reproduction output group may be composed of one audio stream only, if the content is for only music. For example, a group composed of one dual mono audio stream only may be one reproduction output group. For example, a group composed of one AC-3 audio stream only may be one reproduction output group.

These informations stored or to be stored in the object information file is not multiplexed by the packet unit on the information record medium, different from the case of the object data file. Therefore, it is possible to reproduce the object data by the information reproduction apparatus, on the basis of the reproduction control information.

Particularly in the present invention, the plurality of partial stream includes the plural-channels stream such as dual mono audio stream, in which the audio information for a plurality of channels is recorded in one partial stream. The reproduction output group definition information defines the reproduction output group so that the plural-channels stream overlappingly belongs to the plurality of reproduction output groups. For example, dual mono audio stream which belongs to one reproduction output group belongs also to other reproduction output groups switchable to the one reproduction group. The channel designation information to designate at least one channel from among the plurality of channels is added to the plurality of reproduction output group to which the plural-channels stream such as dual mono audio stream as mentioned above overlappingly belongs. Furthermore, the content of this channel designation information differs among the plurality of reproduction output groups. For example, the channel designation information designates CH (channel number) #0 which corresponds to the main audio such as Japanese sound, relative to dual mono audio stream which belongs to one reproduction output group, designates CH #1 which corresponds to the sub-audio such as English sound, relative to the same dual mono audio stream which belongs to another reproduction group, and designates CH #0 and CH #1 which corresponds to the main audio and the sub-audio, respectively, relative to the same dual audio stream which belongs to still another reproduction group.

Therefore, if the plurality of audio streams including such as linear PCM audio stream, AC-3 audio stream, MPEG audio stream, dual mono audio stream, and so on are included in the whole stream as the partial streams, the sound to be reproduced can be switched by the aforementioned "stream switching", during the reproduction, on the basis of the reproduction output group which is composed of the plurality of partial streams switchable to each other and recorded in the plurality of reproduction output group definition informations. For example, an AC-3 sound output can be switched to a dual mono sound output. Alternatively, the AC-3 sound output can be switched to a linear PCM sound output.

Furthermore, with regard to the dual mono audio stream, the sound to be reproduced and outputted can be switched by the aforementioned "in-stream audio switching", on the basis of the channel designation information. For example, the main audio can be reproduced and outputted as two reproduction outputs for a left speaker (L speaker) and a right speaker (R speaker), or the sub-audio can be reproduced and outputted as these two reproduction outputs. Alternatively, the main audio can be reproduced and outputted for one speaker and the sub-audio can be reproduced and outputted for the other speaker, as these two reproduction outputs.

Thus, since the same plural-channels stream is overlappingly registered so as to belong to the plurality of reproduction output groups in the reproduction control information as logic information, there is no or little need for the information reproduction apparatus to distinguish, for example, the in-stream audio switching in one dual mono audio stream and the stream switching among different streams, in the control processing. That is, if partial streams specified in the reproduction output group specified by the reproduction control information (i.e. the relationship definition information, the reproduction output group definition information and the channel designation information) as the logic information are reproduced and outputted, or if the audio information of the channel specified in the specified partial stream, both the stream switching and the in-stream audio switching can be performed almost in the same manner. In other words, the present invention makes it possible to perform both the stream switching and the in-stream audio switching as processings at the same level in this hierarchy, by providing the logic hierarchy specific to the present invention. Thereby, the information reproduction apparatus can perform both the stream switching processing and the in-stream audio switching processing as processings at the same level relatively easy with a relatively simple logic structure.

Furthermore, there is no or little need for a user to distinguish the in-stream audio switching in one dual mono stream and the stream switching among different streams, when performing the switching with the aid of a remote controller or the like, for example. That is, there is no or little complicated user's operation due to two kinds of switching.

Consequently, according to the information record medium of the present invention, it is possible to perform the stream switching among the plurality of audio streams including one plural-channels stream such as dual mono audio stream, during the reproduction, with a relatively simple structure. Furthermore, it is possible to perform the in-stream audio switching in one plural-channels stream such as dual mono audio stream.

In an aspect of the information record medium of the present invention, the plural-channels stream is provided with audio stream in a dual mono format in which the audio information is composed of main audio information and sub-audio information.

According to this aspect, it is possible to perform the stream switching among the plurality of audio streams including dual mono audio stream, during the reproduction. Furthermore, it is possible to perform the in-stream switching in the dual mono audio stream.

In this aspect, the plurality of partial streams may include, in addition to audio stream in the dual mono format, an audio stream in a predetermined format different from the dual mono format, and the reproduction output group definition information may define the reproduction output group so that a reproduction output group to which the audio stream in the predetermined format belongs and a plurality of reproduction output groups to which audio stream in the dual mono format overlappingly belongs are switchable to each other.

In this arrangement, it is possible to perform the stream switching among the plurality of audio streams including the dual mono audio stream, the AC-3 audio stream different from the dual mono audio stream, and so on, during the reproduction.

In another aspect of the information record medium of the present invention, the object information file further includes, as the reproduction control information, related group definition information to define, as a related group, a group of content having a special relationship from among a plurality of the series of content composing the plurality of partial streams, and the reproduction output group definition information defines a group of partial streams switchable to each other in the related group, the group of partial streams being reproduced and outputted collectively by the group, as the reproduction output group.

According to this aspect, the object information file further includes the related group definition information to define, as the related group (e.g. an AU as mentioned below), the group of content having a special relationship from among the plurality of the series of content composing the plurality of partial streams. For example, the special relationship is such a relationship between an original English sound movie and the dubbed version with Japanese, a relationship between angles switchable to each other in a multi-angle reproduction, a relationship between multi-visions switchable to each other in a multi-vision reproduction, and so on. Furthermore, the reproduction output group definition information defines the group of partial streams switchable to each other in the related group as the reproduction output group. The group of partial streams is reproduced and outputted collectively by the group. Therefore, the information reproduction apparatus can specify easily elementary streams having a special relationship and switchable to each other in the related group, such as multi-vision broadcasting or multi-view broadcasting, bilingual broadcasting, bilingual captioned broadcasting and so on.

In another aspect of the information record medium of the present invention, the information record medium is further provided with a reproduction sequence information file for storing reproduction sequence information to define a reproduction sequence of the object data stored in the object data file.

According to this aspect, the reproduction sequence information file stores the reproduction sequence information (e.g. playlist information as mentioned below) to define the reproduction sequence of the object data stored in the object data file. This reproduction sequence information is not multiplexed by the packet unit on the information record medium, different from the case of the object data file. Therefore, it is possible to reproduce the object data by the information reproduction apparatus as intended, on the basis of the aforementioned reproduction control information and the reproduction sequence information.

(Information Record Apparatus and Method)

The information record apparatus according to the present invention is an information record apparatus for recording a whole stream including a plurality of partial streams each composed of video information or audio information onto an information record medium by a packet unit that is a physically accessible unit, the video information or the audio information providing a series of content, the information record apparatus is provided with: a first record device for recording an object data file for storing object data composed of a plurality of packets each storing pieces of the video information or the audio information and being a logically accessible unit; and a second record device for recording an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively by the group, as a reproduction output group, wherein the plurality of partial streams includes a plural-channels stream that is composed by recording the audio information for a plurality of channels in one partial stream, and the reproduction output group definition information includes channel designation information to designate at least one channel from among the plurality of channels.

According to the information record apparatus of the present invention, the first record device such as a system controller, an encoder, a TS object generator mentioned below, an optical pickup or the like, records the object data file for storing the object data. The second record device such as a system controller, an optical pickup or the like, records the object information file for storing the relationship definition information and the reproduction output group definition information, as the reproduction control information.

In this case, although the first record device multi-records the object data by the packet unit, the second device does not multi-record the reproduction control information by the packet unit. Particularly, the plurality of partial streams include the plural-channels stream such as dual mono audio stream, and the reproduction output group definition information defines the reproduction output group so that the plural-channels stream overlappingly belongs to the plurality of reproduction output groups. Furthermore, the channel designation information is added to the relationship definition information, with regard to the plurality of reproduction output groups to which the plural-channels stream belongs. The content of the channel designation information differ among the plurality of reproduction output groups. Therefore, it is relatively easy to perform the recording relative to the information record medium of the present invention.

Incidentally, the information record apparatus according to the present invention may also take various aspects, correspondingly to various aspects of the information record medium according to the present invention as mentioned above.

The information record method according to the present invention is an information record method of recording a whole stream including a plurality of partial streams each composed of video information or audio information onto an information record medium by a packet unit that is a physically accessible unit, the video information or the audio information providing a series of content, the information record method is provided with: a first record process of recording an object data file for storing object data composed of a plurality of packets each storing pieces of the video information or the audio information and being a logically accessible unit; and a second record process of recording an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively by the group, as a reproduction output group, wherein the plurality of partial streams includes a plural-channels stream that is composed by recording the audio information for a plurality of channels in one partial stream, and the reproduction output group definition information includes channel designation information to designate at least one channel from among the plurality of channels.

According to the information record method of the present invention, as in the case of the information record medium according to the present invention, the first record process is for recording the object data file for storing the object data, the second record process is for recording the object information file for storing the relationship definition information as the reproduction control information.

In this case, although the object data is multi-recorded by the packet unit in the first record process, the reproduction sequence information and the reproduction control information are not multi-recorded by the packet unit in the second record process. Particularly, the plurality of partial streams includes the plural-channels stream such as dual mono audio stream, and the channel designation information is added to the relationship definition information, with regard to the plurality of reproduction output group to which the plural-channels stream. Since the content of the channel designation information differ among the plurality of reproduction output groups, it is relatively easy to perform the recording relative to the information record medium of the present invention.

Incidentally, the information record method according to the present invention may also take various aspects, correspondingly to various aspects of the information record medium according to the present invention.

(Information Reproduction Apparatus and Method)

The information reproduction apparatus according to the present invention is an information reproduction apparatus for reproducing at least a part of the recorded whole stream from the information record medium according to the present invention mentioned above (including various aspects thereof), the information reproduction apparatus is provided with: a read device for reading information physically from the information record medium; and a reproduction device for reproducing the object data, on the basis of the reproduction control information included in the information read by the read device, wherein, when the plurality of reproduction output groups to which the plural-channels stream overlappingly belongs is reproduced, the reproduction device selectively reproduces and outputs the audio information relating to the channel designated by the channel designation information.

According to the information reproduction apparatus of the present invention, the read device such as an optical pickup and a decoder reads physically the information from the information record medium by the packet unit. The reproduction device such as a system controller, a demultiplexer and a decoder reproduces the object data read by the packet unit, on the basis of the reproduction control information included in the read information. Particularly in this case, the reproduction device selectively reproduces and outputs the audio information relating to one or more channels designated by the channel designation information, when the plurality of reproduction output groups to which the plural-channels stream overlappingly belongs is reproduced. Therefore, it is relatively easy to perform the reproduction from the information record medium of the present invention. Especially, it is relatively easy to perform both the stream switching and the in-stream audio switching, on the basis of the reproduction control information.

Incidentally, the information reproduction apparatus according to the present invention may also take various aspects, correspondingly to various aspects of the information record medium according to the present invention.

The information reproduction method according to the present invention is an information reproduction method of reproducing at least a part of the recorded whole stream from the information record medium according to the present invention mentioned above (including various aspects thereof), the information reproduction method is provided with: a read process of reading information physically from the information record medium; and a reproduction process of reproducing the object data, on the basis of the reproduction control information included in the information read by the read device, wherein, when the plurality of reproduction output groups to which the plural-channels stream overlappingly belongs is reproduced, the reproduction device selectively reproduces and outputs the audio information relating to the channel designated by the channel designation information.

According to the information reproduction method of the present invention, as in the case of the information record medium of the present invention, the read process is for physically reading the information from the information record medium by the packet unit. The reproduction process is for reproducing the object data read by the packet unit, on the basis of the reproduction control information and the reproduction sequence information included in the read information. Particularly in this case, in the reproduction process, when the plurality of reproduction output groups to which the plural-channels stream belongs is reproduced, the audio information relating to one or more channels designated by the channel designation information is selectively reproduced and outputted. Therefore, it is relatively easy to perform the reproduction from the information record medium of the present invention. Especially, it is relatively easy to perform both the stream switching and the in-stream audio switching, on the basis of the reproduction control information.

Incidentally, the information reproduction method according to the present invention may also take various aspects, correspondingly to various aspects of the information record medium according to the present invention as mentioned above.

(Information Record Reproduction Apparatus and Method)

The information record reproduction apparatus according to the present invention is an information record reproduction apparatus for recording the whole stream onto the information record medium according to the present invention mentioned above (including various aspects thereof) and reproducing at least a part of the recorded whole stream, the information record reproduction apparatus is provided with: a first record device for recording the object data file; a second record device for recording the object information file; a read device for reading information physically from the information record medium; and a reproduction device for reproducing the object data, on the basis of the reproduction control information included in the information read by the read device, wherein when the plurality of reproduction output groups to which the plural-channels stream overlappingly belongs is reproduced, the reproduction device selectively reproduces and outputs the audio information relating to the channel designated by the channel designation information.

According to the information record reproduction apparatus of the present invention, as in the case of the information record apparatus of the present invention, the first record device multi-records the object data file by the packet unit, and the second record device records the object information file. Then, as in the case of the information reproduction apparatus of the present invention, the read device physically reads the information from the information record medium, and the reproduction device reproduces the object data read by the packet unit, on the basis of the reproduction control information included in the read information. Therefore, it is relatively easy to collectively record the whole stream such as at least a part of the MPEG2 transport streams relative to the information record medium of the present invention, and appropriately reproduce the information multi-recorded onto the information record medium, as a series of content information. Particularly, during the reproduction, it is relatively easy to perform both the stream switching and the in-stream switching, on the basis of the reproduction control information.

Incidentally, the information record reproduction apparatus according to the present invention may also take various aspects, correspondingly to various aspects of the information record medium according to the present invention.

The information record reproduction method according to the present invention is an information record reproduction method of recording the whole stream onto the information record medium according to the present invention mentioned above (including various aspects thereof) and reproducing at least a part of the recorded whole stream, the information record reproduction method is provided with: a first record process of recording the object data file; a second record process of recording the object information file; a read process of reading information physically from the information record medium; and a reproduction process of reproducing the object data, on the basis of the reproduction control information included in the information read by the read device, wherein when the plurality of reproduction output groups to which the plural-channels stream overlappingly belongs is reproduced, the reproduction device selectively reproduces and outputs the audio information relating to the channel designated by the channel designation information.

According to the information record reproduction method of the present invention, as in the case of the information record method of the present invention, the first record process is for recording the object data file by the packet unit, and the second record process is for recording the object information file. Then, as in the case of the information reproduction method of the present invention, the read process is for physically reading the information from the information record medium, and the reproduction device is for reproducing the object data read by the packet unit, on the basis of the reproduction control information included in the read information. Therefore, it is relatively easy to collectively record the whole stream such as at least a part of the MPEG2 transport streams, and appropriately reproduce the information multi-recorded onto the information record medium, as a series of content information. Especially, it is relatively easy to perform both the stream switching and the in-stream audio switching during the reproduction, on the basis of the reproduction control information.

Incidentally, the information record reproduction method according to the present invention may also take various aspects, correspondingly to various aspects of the information record medium according to the present invention.

(Computer Program)

The first computer program according to the present invention is a computer program for a record control to control a computer disposed at the information record apparatus according to the present invention mentioned above (including various aspects thereof), the computer program making the computer function as at least a part of the first record device and the second record device.

According to the first computer program for a record control of the present invention, the information record apparatus according to the present invention mentioned above may be embodied relatively easily, by reading and running the computer program product from a record medium, such as a ROM, a CD-ROM, a DVD-ROM, a hard disk and so on, storing the computer program therein/thereon.

The second computer program according to the present invention is a computer program for a reproduction control to control a computer disposed at the information reproduction apparatus according to the present invention mentioned above (including various aspects thereof), the computer program making the computer function as at least a part of the read device and the reproduction device.

According to the second computer program for a reproduction control of the present invention, the information reproduction apparatus according to the present invention mentioned above may be embodied relatively easily, by reading and running the computer program product from a record medium, such as a ROM, a CD-ROM, a DVD-ROM, a hard disk and so on, storing the computer program therein/thereon.

The third computer program according to the present invention is a computer program for a record reproduction control to control a computer disposed at the information record reproduction apparatus according to the present invention mentioned above (including various aspects thereof), the computer program making the computer function as at least a part of the first record device, the second record device, the read device and the reproduction device.

According to the third computer program for a record reproduction control of the present invention, the information record reproduction apparatus according to the present invention mentioned above may be embodied relatively easily, by reading and running the computer program product from a record medium, such as a ROM, a CD-ROM, a DVD-ROM, a hard disk and so on, storing the computer program therein/thereon.

The above object of the present invention is achieved by a computer program product for a record control in a computer-readable medium for tangibly embodying a program of instructions executable by a computer disposed at the aforementioned information record apparatus according to the present invention (including various aspects), the program making the computer function as at least a part of the first record device and the second record device.

The above object of the present invention is achieved by a computer program product for a reproduction control in a computer-readable medium for tangibly embodying a program of instructions executable by a computer disposed at the information reproduction apparatus according to the present invention (including various aspects), the program making the computer function as at least a part of the read device and the reproduction device.

The above object of the present invention is achieved by a computer program product for a record reproduction control in a computer-readable medium for tangibly embodying a program of instructions executable by a computer disposed at the information record reproduction apparatus according to the present invention (including various aspects), the program making the computer function as at least a part of the first record device, the second record device, the read device and the reproduction device.

According to the computer program products for the record control, the reproduction control, or the record reproduction control of the present invention, at least a part of the first record device, the second record device, the read device and the reproduction device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first record device, the second record device, the read device and the reproduction device.

(Data Structure Including Control Signal)

The data structure including a control signal according to the present invention is a data structure including a control signal in which a whole stream including a plurality of partial streams each composed of video information or audio information is multi-recorded by a packet unit that is a physically accessible unit, the video information or the audio information providing a series of content, the data structure is provided with: an object data file for storing object data composed of a plurality of packets each storing pieces of the video information the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively by the group, as a reproduction output group, wherein the plurality of partial streams includes a plural-channels stream that is composed by recording the audio information for a plurality of channels in one partial stream, and the reproduction output group definition information includes channel designation information to designate at least one channel from among the plurality of channels.

According to the data structure including the control signal of the present invention, as in the case the information record medium of the present invention, it is relatively easy to perform both the stream switching and the in-stream switching during the reproduction, on the basis of the reproduction control information.

These effects and other advantages of the present invention will be more apparent from the following embodiments and examples.

As discussed above, according to the information record medium of the present invention, the object information file stores the relationship definition information and the reproduction output definition information, to which the channel designation information is added, with regard to the plurality of reproduction output groups to which the plural-channels stream overlappingly belongs. Thereby, it is possible to perform the stream switching among the plurality of audio streams including the dual mono audio stream during the reproduction. Furthermore, it is possible to perform the in-stream audio switching in the dual mono audio stream or the like. According to the information record apparatus or method of the present invention, since there are provided with the first and second record devices or the first and second record processes, when the information recorded by them onto the information record medium is reproduced, it is possible to perform both the stream switching among the plurality of audio streams and the in-stream audio switching in the dual mono audio stream or the like. According to the information reproduction apparatus or method of the present invention, since there are provided with the read device and the reproduction device or the read process and the reproduction process, it is possible to perform both the stream switching among the plurality of audio streams and the in-stream audio switching in the dual mono audio stream or the like. Furthermore, according to the computer program of the present invention, since the computer is functioned as the information record apparatus, the information reproduction apparatus or the information record reproduction apparatus of the present invention, it is possible to perform the recording relative to the information record medium of the present invention or reproduce the information from the medium.

BRIEF DESCRIPTION OF DRAWINGS

FIG. 3 is a diagram schematically illustrating a data structure recorded onto the optical disc in the embodiment.

FIG. 21 is a conceptual diagram showing data structures in an AU table and an ES table in the embodiment.

FIG. 24 is a view conceptually illustrating a general flow of an access during a reproduction in the embodiment, in association with a logic structure of an optical disc.

BEST MODE FOR CARRYING OUT THE INVENTION (Information Record Medium)

The information record medium of the present invention is discussed, with reference to its embodiments, as well as FIG. 1 to FIG. 13. In these embodiments, the information record medium of the present invention is applied to an optical disc capable of recording (writing) and reproducing (reading).

Figure 1:
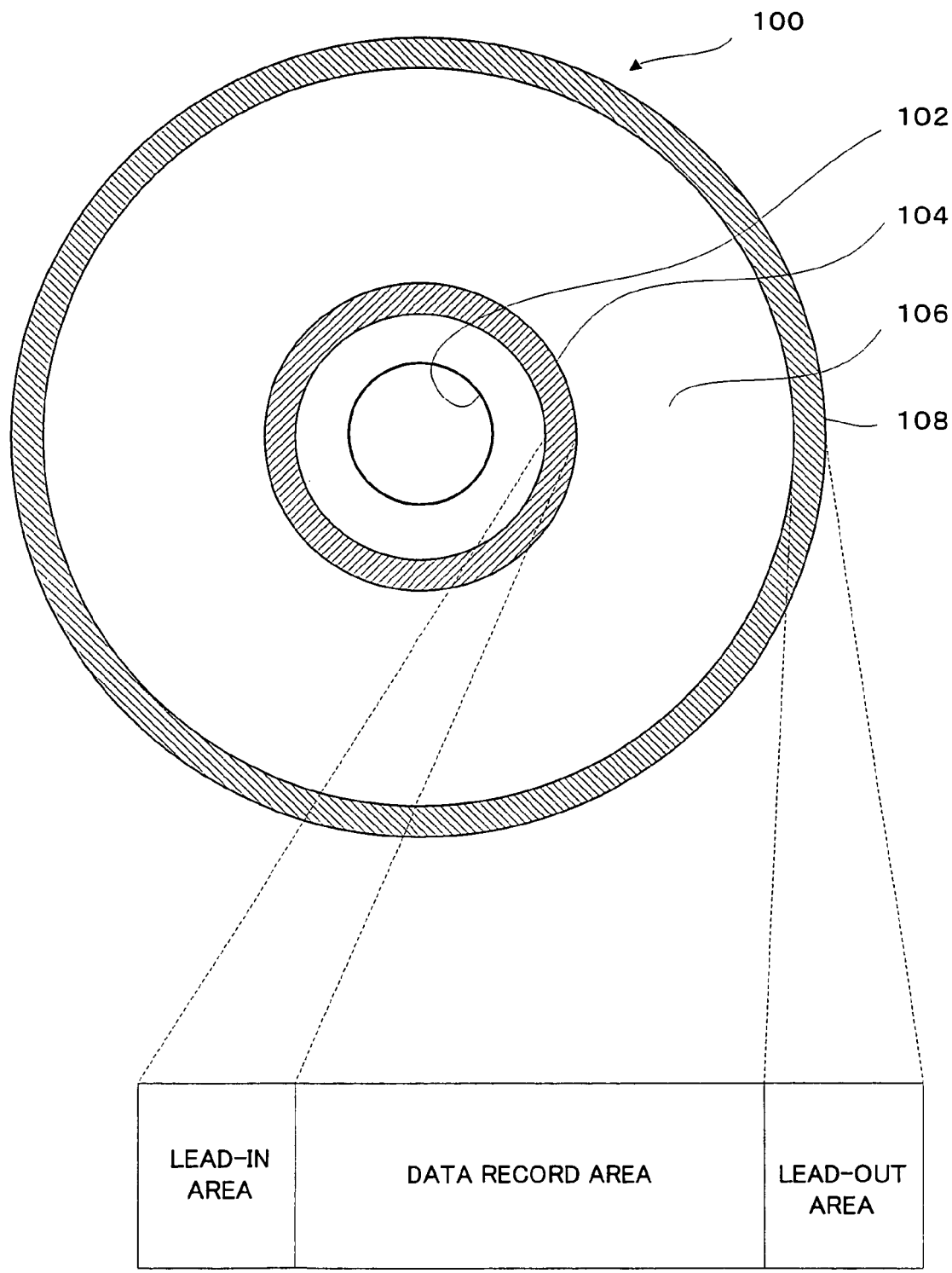
FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Figure 2A:
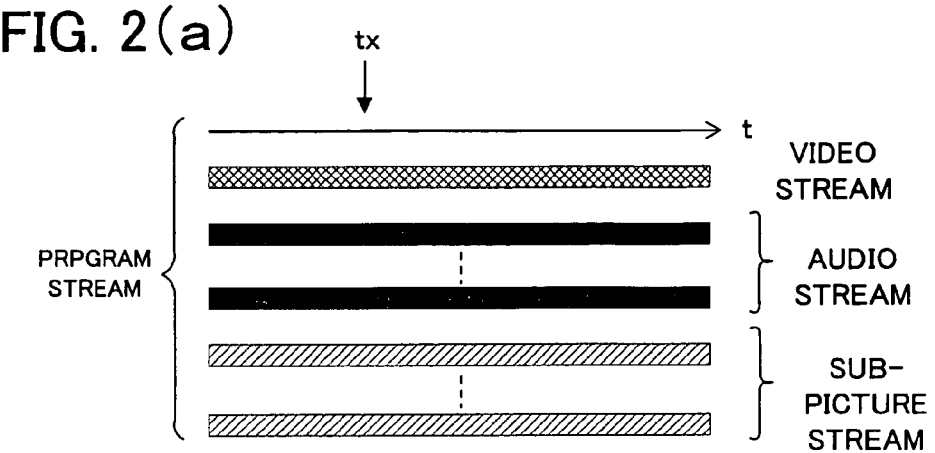
FIG. 2 illustrates a schematic conceptual diagram (FIG. 2(a)) of a conventional program stream of MPEG2; a schematic conceptual diagram (FIG. 2(b)) of a transport stream of MPEG2 used in the embodiment; and a schematic conceptual diagram (FIG. 2(c)) of a program stream of MPEG2 used in the embodiment.
Figure 2B:
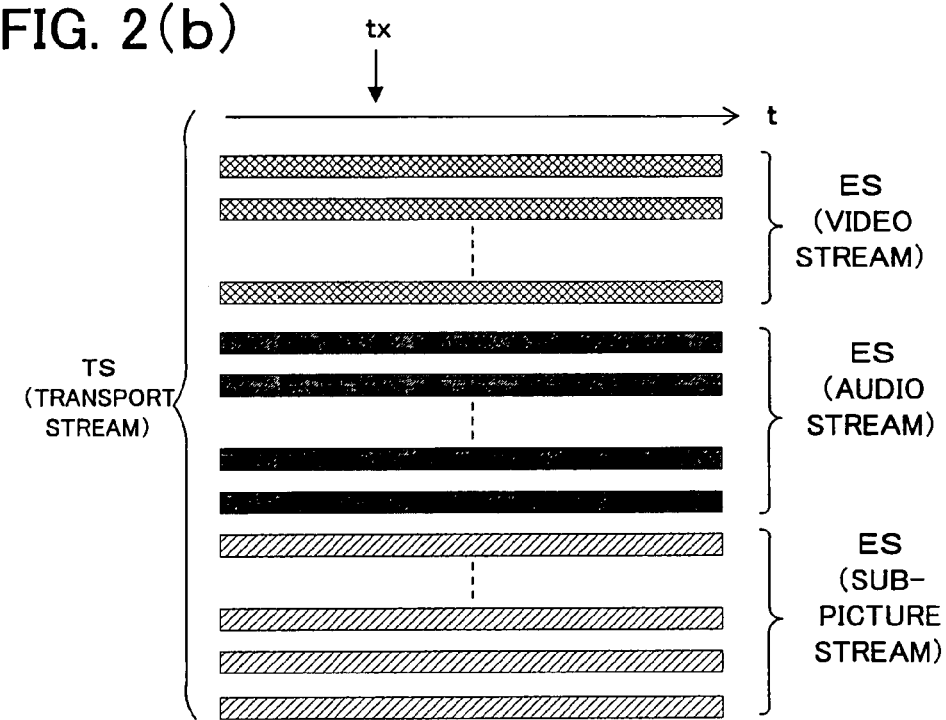
Figure 2C:
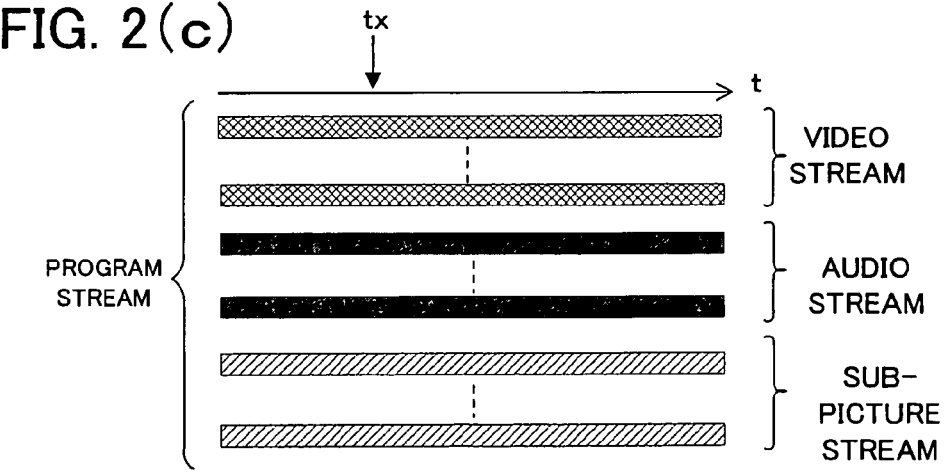

Next, with reference to FIG. 2, the structures of the transport stream (TS) and the program stream (PS) to be recorded onto the optical disc in the embodiment are discussed. FIG. 2(a) schematically illustrates a MPEG2 program stream of a conventional DVD for a comparison, FIG. 2(b) schematically illustrates a MPEG2 transport stream (TS) structure. Furthermore, FIG. 2(c) schematically illustrates a MPEG2 program stream structure in the present invention.

In FIG. 2(a), one program stream to be recorded in the conventional DVD includes only one video stream for video data as video information (i.e. main picture information), along the time axis t, and further includes up to 8 audio streams of audio data as audio information, up to 32 sub-picture streams for sub-picture data as sub-picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) to be recorded in the optical disc 100 of the present invention includes a plurality of video streams as elementary streams (ES) for video data as video information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

In FIG. 2(c), one program stream (PS) to be recorded onto the optical disc 100 of the present invention includes a plurality of video streams for video data as video information, and further includes a plurality of audio streams for audio data as audio information and a plurality of sub-picture streams for sub-picture data as sub-picture information. That is, the video data to be multiplexed at an arbitrary time point tx relates to a plurality of video streams. For example, a plurality of video streams that may correspond to a plurality of TV programs or a plurality of movies can be included at the same time in the program stream.

Incidentally, for convenience of explanation, the video stream, the audio stream and the sub-picture stream are arranged in this order from the top in FIG. 2(a) to FIG. 2(c). Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) as shown in FIG. 2(b), i.e. to record a plurality of programs at the same time. Furthermore, instead of or in addition to this transport stream, the program stream (PS) as shown in FIG. 2(c) can be multi-recorded onto the same optical disc 100.

Figure 4:
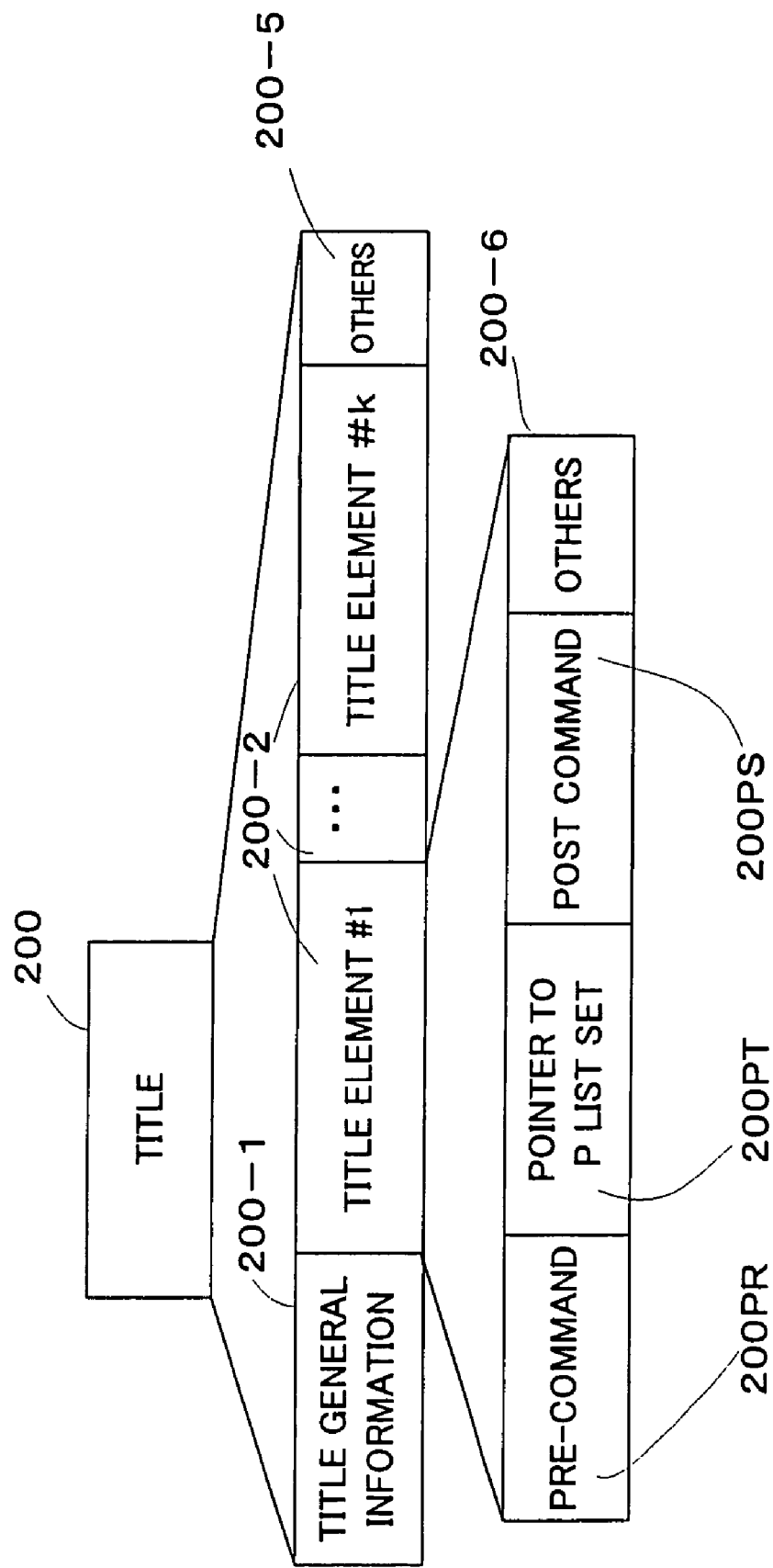
FIG. 4 is a conceptual diagram hierarchically illustrating a detail of a data structure in each title shown in FIG. 3.
Figure 5:
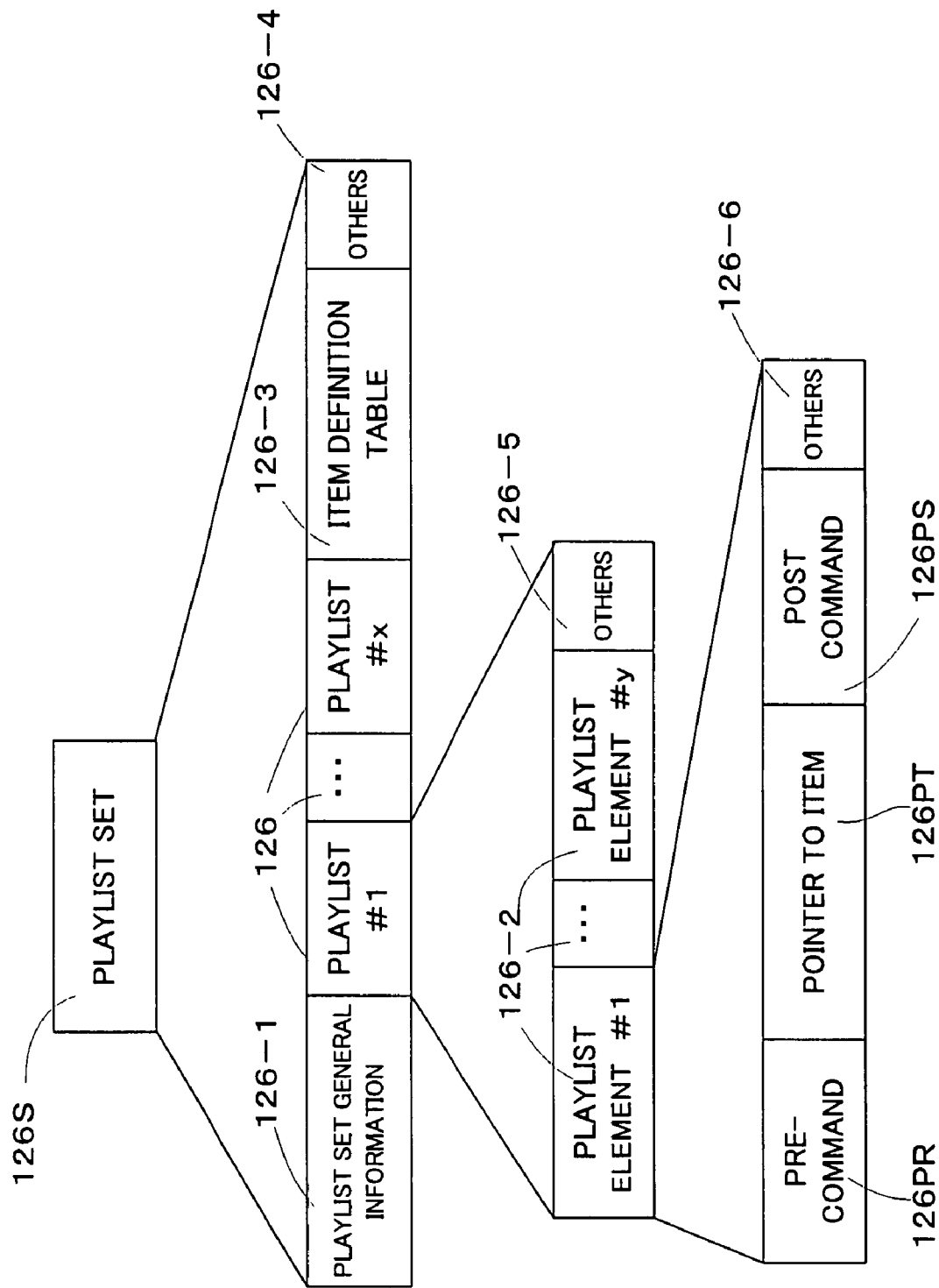
FIG. 5 is a conceptual diagram hierarchically illustrating a detail of a data structure in each playlist set shown in FIG. 3
Figure 6:
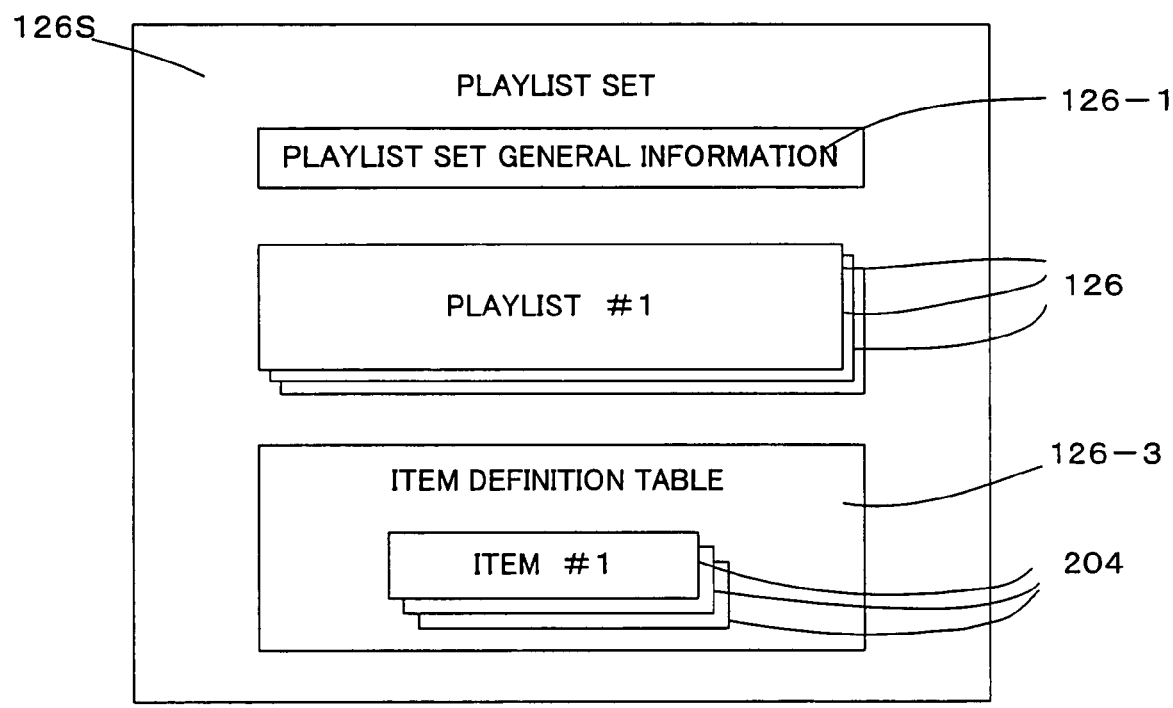
FIG. 6 is a conceptual diagram schematically illustrating a detail of a data structure in each playlist set shown in FIG. 3.
Figure 7:
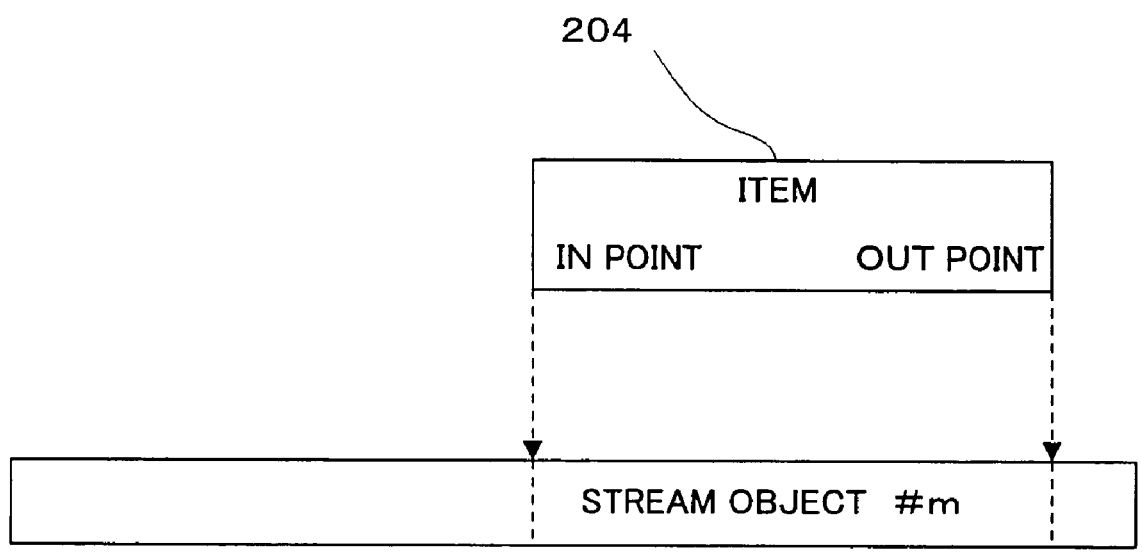
FIG. 7 is a conceptual diagram schematically illustrating a detail of a data structure of each item shown in FIG. 6.
Figure 8:
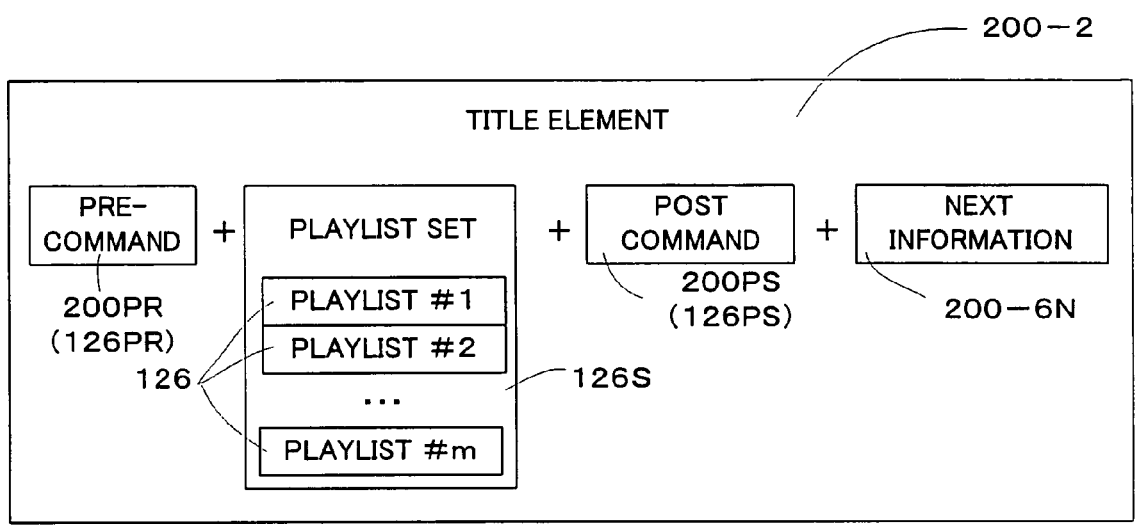
FIG. 8 is a conceptual diagram schematically illustrating a logic structure of data in each title element shown in FIG. 4.
Figure 9:
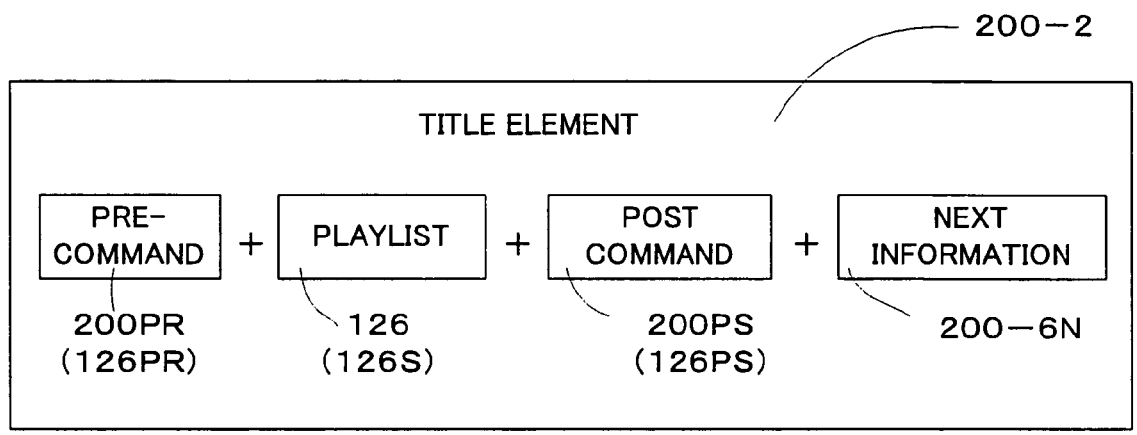
FIG. 9 is a conceptual view schematically illustrating a logic structure of data in each title element shown in FIG. 4, in a case that each playlist set is composed of one playlist.
Figure 10:
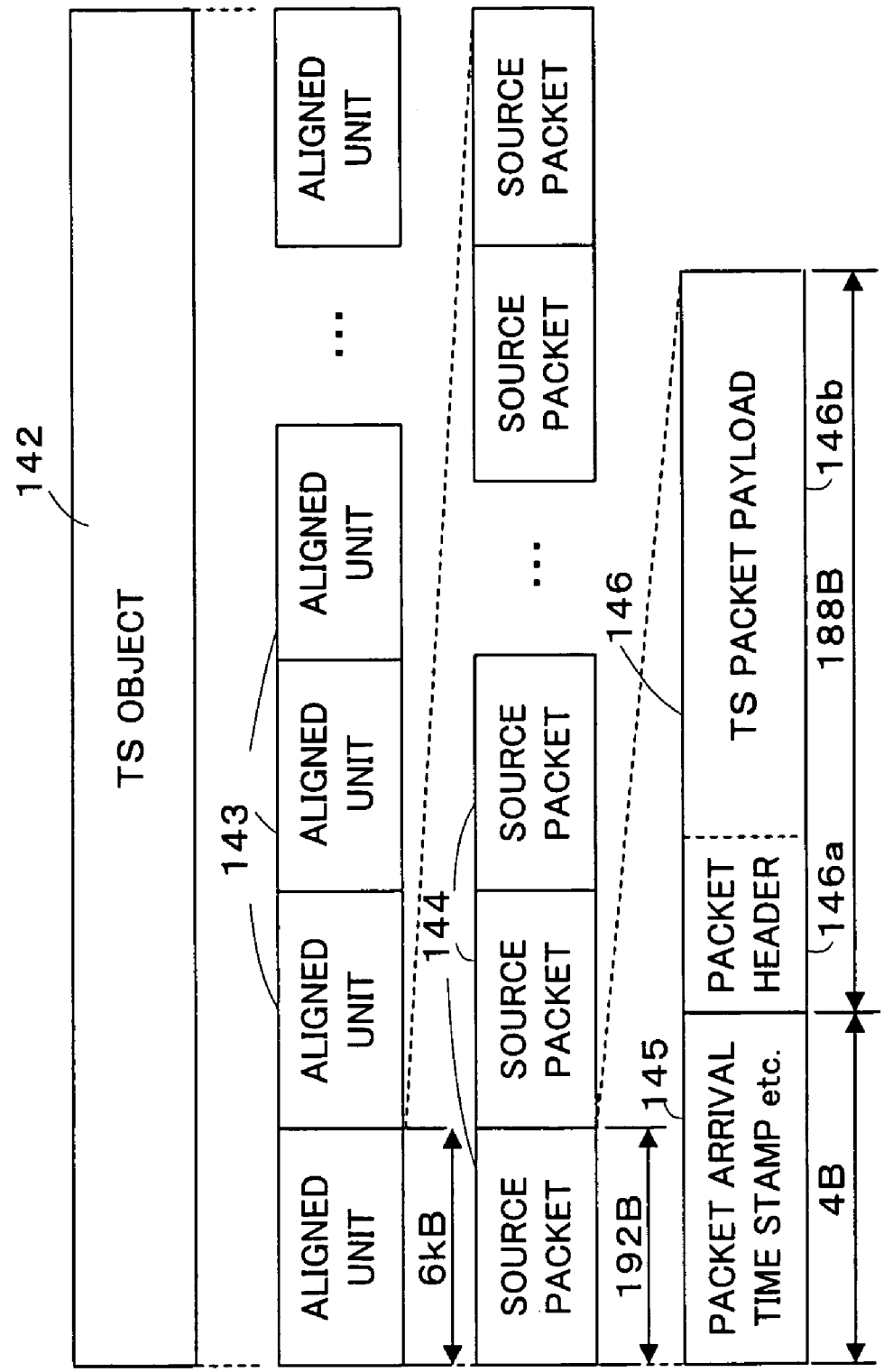
FIG. 10 is a conceptual view schematically illustrating a detail of a data structure in each object shown in FIG. 3.

Next, with reference to FIG. 3 and FIG. 10, a structure of data to be recorded onto the optical disc 100 is discussed. FIG. 3 schematically illustrates the data structure to be recorded onto the optical disc 100. FIG. 4 schematically illustrates in detail the data structure in each title shown in FIG. 3. FIG. 5 and FIG. 6 schematically show a data structure in detail respectively in each playlist (P list) set shown in FIG. 3. FIG. 7 schematically shows a detail of the data structure of each item shown in FIG. 6. FIG. 8 schematically shows a logic structure of data in each title element shown in FIG. 4. FIG. 9 schematically shows a logic structure of data in each title element, in a case that each playlist set is composed of one playlist. FIG. 10 schematically shows a detail of a data structure in each object shown in FIG. 3.

In the following explanation, the "title" means a reproduction unit, on the basis of which a plurality of "playlists" is executed continuously or sequentially, and which is a logically large grouped unit, such as one movie or one TV program. The "playlist set" means a bundle of "playlists". For example, it may be a bundle of playlists to reproduce a plurality of content information having a special relationship switchable to each other in an angle reproduction or a parental reproduction, or may be a bundle of playlists to reproduce content information relating to a plurality of programs broadcasted in the same time zone and collectively recorded. Alternatively, it may be a bundle of playlists to reproduce various content information, in one title, prepared on the basis of required function, for example on the basis of video performance or audio performance required for the information reproduction system, such as a high vision compatibility, a display resolution, a surround speaker compatibility, a speaker layout and so on. The "playlist" is information for storing the information required to reproduce the "object" and is made of a plurality of "items" each storing the information about a reproduction range of the object to access the object. The "object" is the entity information of content constructing the aforementioned MPEG2 transport stream.

In FIG. 3, the optical disc 100 is provided with four files as a logical structure: a disc information file 110; a playlist (P list) information file 120; an object information file 130; and an object data file 140. The optical disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total numbers of titles or the like in the optical disc 100. The title information table 114 includes a title pointer 114-1 and a plurality of titles 200 (title #1-#m) whose ID (identification) number or record address is indicated by the title pointer. In each title 200, each title type (e.g. sequential reproduction type, branch type and so on), or the playlist (P list) number constructing each title is recorded for each title, as the logical information.

More specifically, for example, as shown in FIG. 4, each title 200 is made of a title general information 200-1, a plurality of title elements 200-2 and other information 200-5. Furthermore, each title element 200-2 is made of a pre-command 200PR, a pointer 200PT to a playlist set, a post command 200PS and other information 200-6.

The pointer 200PT as an example of the first pointer information according to the present invention indicates an ID number of the playlist set 126S stored in the playlist information file 120 corresponding to content information to be reproduced on the basis of the title element 200-2 including the pointer 200PT. Incidentally, the pointer 200PT may be information to indicate a record position of the playlist set 126S corresponding to the content information to be reproduced on the basis of the title element 200-2. The pre-command 200PR as an example of the first pre-command according to the present invention indicates a command to be executed before reproducing the content information whose reproduction sequence is defined by one playlist set 126S designated by the pointer 200PT. The post command 200PS as an example of the first post command according to the present invention is a command to be executed after reproducing the content information whose reproduction sequence is defined by the one playlist set. Other information 200-5 included in the title element 200-2 may include next information to designate a title element for a next reproduction after the present reproduction of the present title element, for example.

Therefore, when the information reproduction apparatus reproduces the information record medium, the desired content information can be reproduced as a title element 200-2, by making access to the playlist set 126S in accordance with the pointer 200PT and performing a control to select playlist corresponding to the desired program or the like from among a plurality of playlists 126 in the playlist set 126S. Furthermore, reproducing such a title element 200-2 solely or sequentially makes it possible to reproduce one title 200. Furthermore, it is possible to execute commands to be executed before reproduction, in the content information whose reproduction sequence is defined by one playlist set 126S designated by the pointer 200PT, according to the pre-command 200PR. Furthermore, it is possible to execute commands to be executed after the reproduction, in the content information whose reproduction sequence is defined by one playlist set 126S designated by the pointer 200PT, according to the post command 200PS. The post command 200PS may be a command to branch the content information, a command to select a next title and so on. Additionally, it is possible to reproduce a next title element 200-2 to be reproduced after the presently reproduced title element 200-2, according to the "next information" included in other information 200-5.

Again in FIG. 3, the playlist information file 120 stores the playlist (P list) information table 121 indicating the logical structure of each playlist. This playlist (P list) information table 121 is divided into the playlist (P list) management information 122, the playlist (P list) set pointer 124, a plurality of playlist (P list) sets 126S (P list set #1-#n), and other information 128. In this playlist information table 121, the logical information of each playlist set 126S is stored in the order of the playlist set number. In other words, the order for storing the each playlist set 126S is the playlist set numbers. Furthermore, in the aforementioned title information table 114, the same playlist set 126S can be referred from a plurality of titles 200. That is, the playlist set #p in the playlist information table 121 may be pointed on the title information table 114, even in the case that title #q and title #r use the same playlist set #p.

As shown in FIG. 5, the playlist set 126S includes playlist set general information 126-1, a plurality of playlists 126 (playlist #1-#x), an item definition table 126-3, and other information 126-4. Each playlist 126 includes a plurality of playlist elements 126-2 (playlist element #1-#y), and other information 126-5. Furthermore, each playlist element 126-2 includes a pre-command 126PR, a pointer 126PT to item, a post command 126PS and other information 126-6.

The pointer 126PT as an example of the second pointer information according to the present invention indicates an identification number of the item defined by the item definition table 126-3 corresponding to the content information to be reproduced on the basis of the playlist element 126-2 including the pointer 126PT. Incidentally, the pointer 126PT may be a record position of the item defined by the item definition table 126-3.

As shown in FIG. 6, in the playlist set 126S, a plurality of items 204 is defined in the item definition table 126-3. They are commonly belonged to a plurality of playlists 126. Furthermore, as the playlist set general information 126-1, a name of each playlist 126 included in the playlist set 126S, UI (user interface information) such as a reproduction time, address information to each item definition table 126-3 and so on are recorded.

Again in FIG. 5, the pre-command 126PR as an example of the second pre-command according to the present invention indicates a command to be executed before reproduction of one item 204 designated by the pointer 126PT. The post command 126PS as an example of the second post command according to the present invention indicates a command to be executed after the reproduction of the one item 204. Other information 126-6 included in the playlist element 126-2 may include the next information to designate the playlist element 126-2 relating to the next reproduction of the reproduction of the playlist element 126-2.

As shown in FIG. 7, the item 204 is a minimum unit to be displayed. In the item 204, "in-point information" to indicate a start address of an object and "out-point information" to indicate an end address of the object are recorded. Incidentally, each of these "in-point information" and "out-point information" may indicate the address directly or indirectly as a time period or time point on the reproduction time scale. In the figure, if a plurality of ES's (Elementary Streams) is multiplexed for the object designated by "stream object #m", designating the item 204 means designating a special ES or special combination of ES's.

As shown in FIG. 8, the title element 200-2 logically is made of the pre-command 200PR or 126PR, the playlist set 126S selected by the pointer 200PT, the post command 200PS or 126PS, and the next information 200-6N. Therefore, a processing to select the playlist 126 from among the playlist set 126S is executed, according to any condition reproducible in a system, such as video resolution.

As shown in FIG. 9, however, if the playlist set designated by the pointer 200PT is made of only one playlist, i.e. if the playlist set 126S shown in FIG. 3 is replaced by a single playlist 126, the title element 200-2 logically is made of the pre-command 200PR or 126PR, the playlist 126 to be reproduced during the reproduction operation, the post command 200PS or 126PS, and the next information 200-6N. In this case, once the playlist set is designated for the reproduction, the single playlist 126 is reproduced, regardless of the condition reproducible in the system.

Again in FIG. 3, in the object information file 130, the storage position (i.e. the logical address of the reproduction object) in the object data file 140 for each item constructed in each playlist 126, and/or various attribute information relating to the reproduction of the item are stored. Particularly in this embodiment, the object information file 130 stores the AU table 131 including a plurality of AU (Associate Unit) information 132I (AU #1-#q) as mentioned below, the ES (Elementary Stream) map table 134 and other information 135.

The object data file 140 stores a plurality of TS objects 142 (TS #1 object-TS #s object) for each transport stream, i.e. entity data of contents to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 10, the TS object 142 shown in FIG. 3, as a logically reproducible unit, may be divided into a plurality of aligned units 143 each having 6 kB of data amount. The head of the aligned units 143 is aligned with the head of the TS object 142. Each aligned unit 143 is further divided into a plurality of source packets 144 each having 192 B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4 B of data amount to control the reproduction, such as the packet arrival time stamp or the like indicating the reproduction start time point of the TS (Transport Stream) packet on the reproduction time scale, and includes the TS packet 146 having 188 B of data amount. The TS packet 146 (also referred to as "TS packet payload") has a packet header 146a at a head portion of a TS packet payload 146b. The video data may be packetized as the "video packet", the audio data may be packetized as the "audio packet", or the sub-picture data may be packetized as the "sub-picture packet", otherwise other data may be packetized.

Figure 11:
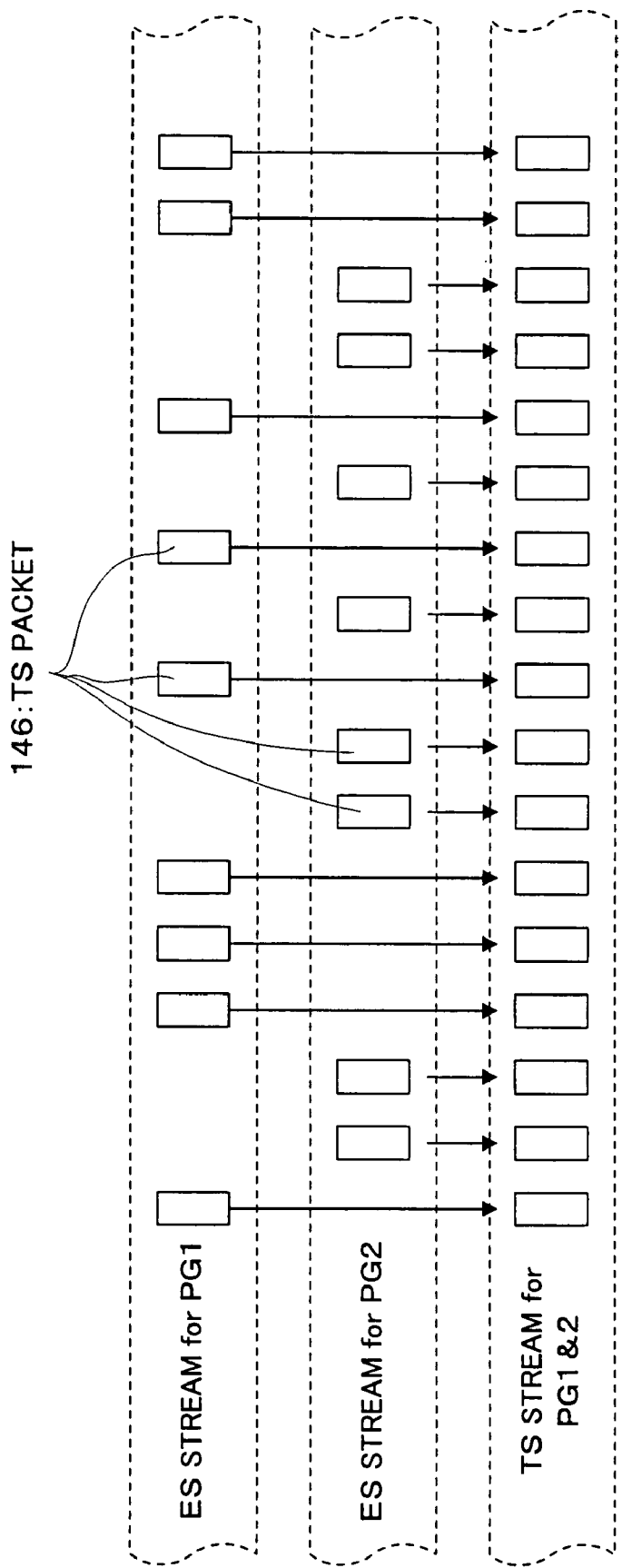
FIG. 11 is a view schematically illustrating a situation that an elementary stream for a program #1, shown in the upper column, and en elementary stream for a program #2, shown in the middle column, are multiplexed to form a transport stream for these two programs, on the basis of a time scale in a horizontal direction.
Figure 12:
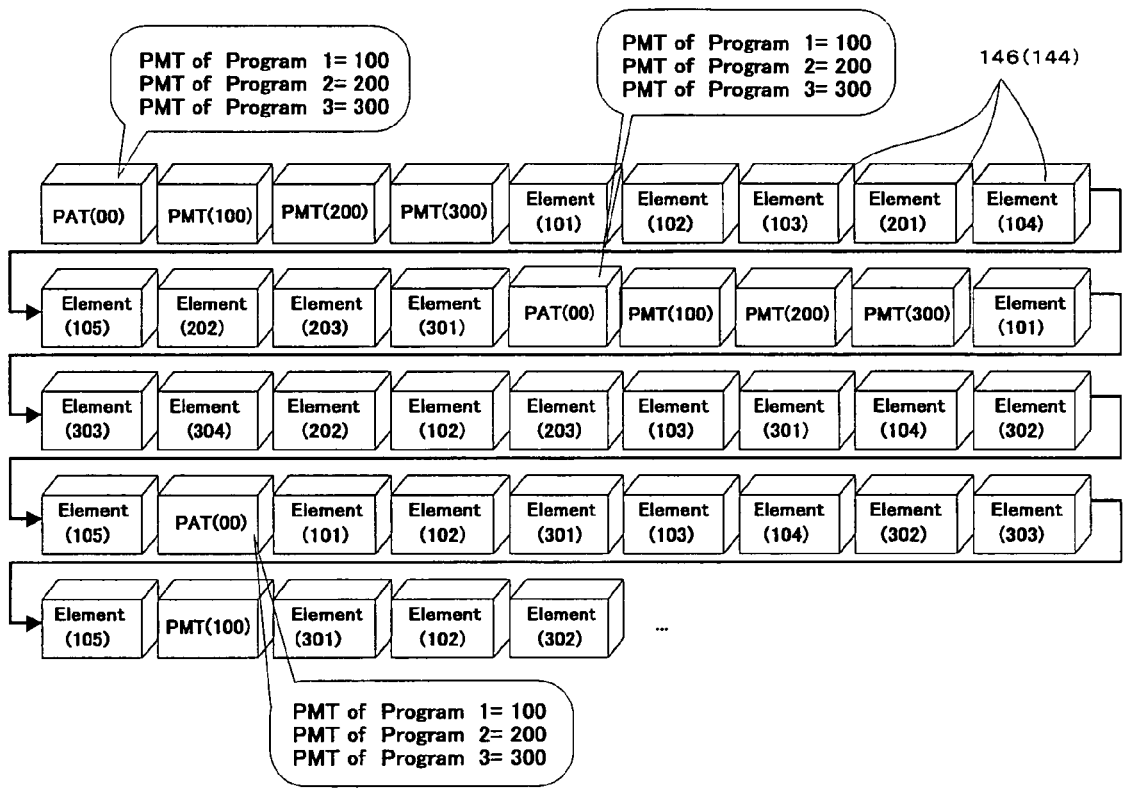
FIG. 12 is a conceptual view conceptually illustrating an image of TS packets multiplexed in one transport stream in the embodiment, as a packet arrangement based on the time scale.

Next, with reference to FIG. 11 and FIG. 12, an explanation is made on the multi-recording of the video data, the audio data, the sub-picture data and the like in the transport stream format as shown in FIG. 2(*b*), by the TS packet 146 shown in FIG. 4. FIG. 11 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 12 conceptually illustrates an image of the TS packets multiplexed in one transport stream (TS), as a packet array along the time (sic).

As shown in FIG. 11, the elementary stream for program #1 (in the upper stage) may be formed by discretely arranging TS packets 146 obtained by packetizing the video data for program #1, along the time axis. The elementary stream for program #2 (in the middle stage) may be formed by discretely arranging TS packets obtained by packetizing the video data for program #2, along the time axis. Then, these TS packets 146 are multiplexed so that the transport stream (in the lower stage) for two programs is made. Incidentally, omitted for convenience of explanation in FIG. 11, the elementary stream made of TS packets obtained by packetizing the audio data and/or the sub-picture stream made of TS packets obtained by packetizing the sub-picture data may be multiplexed similarly as the elementary stream for program #1, as shown in FIG. 2(*b*). In addition to this, the elementary stream made of TS packets obtained by packetizing the audio data and the sub-picture stream made of TS packets obtained by packetizing the sub-picture data may be multiplexed similarly as the elementary stream for program #2.

As shown in FIG. 12, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 12, the TS packet 146 being made of the data forming program #i (i=1, 2, 3) is indicated by "element (i0j)", wherein, j (j=1, 2, . . . ) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 is distinguished from each other even if multiplexed at the same time point.

Furthermore, in FIG. 12, the PAT (Program Association Table) and the PMT (Program Map Table) are also packetized by the TS packet 146 unit and multiplexed. The PAT among them stores a table indicating a plurality of PMT packet ID's. Particularly, the PAT is defined by MPEG2 standard so that (000) is given as a predetermined packet ID, as shown in FIG. 12. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 12 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 10. That is, when the transport stream as shown in FIG. 12 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 13:
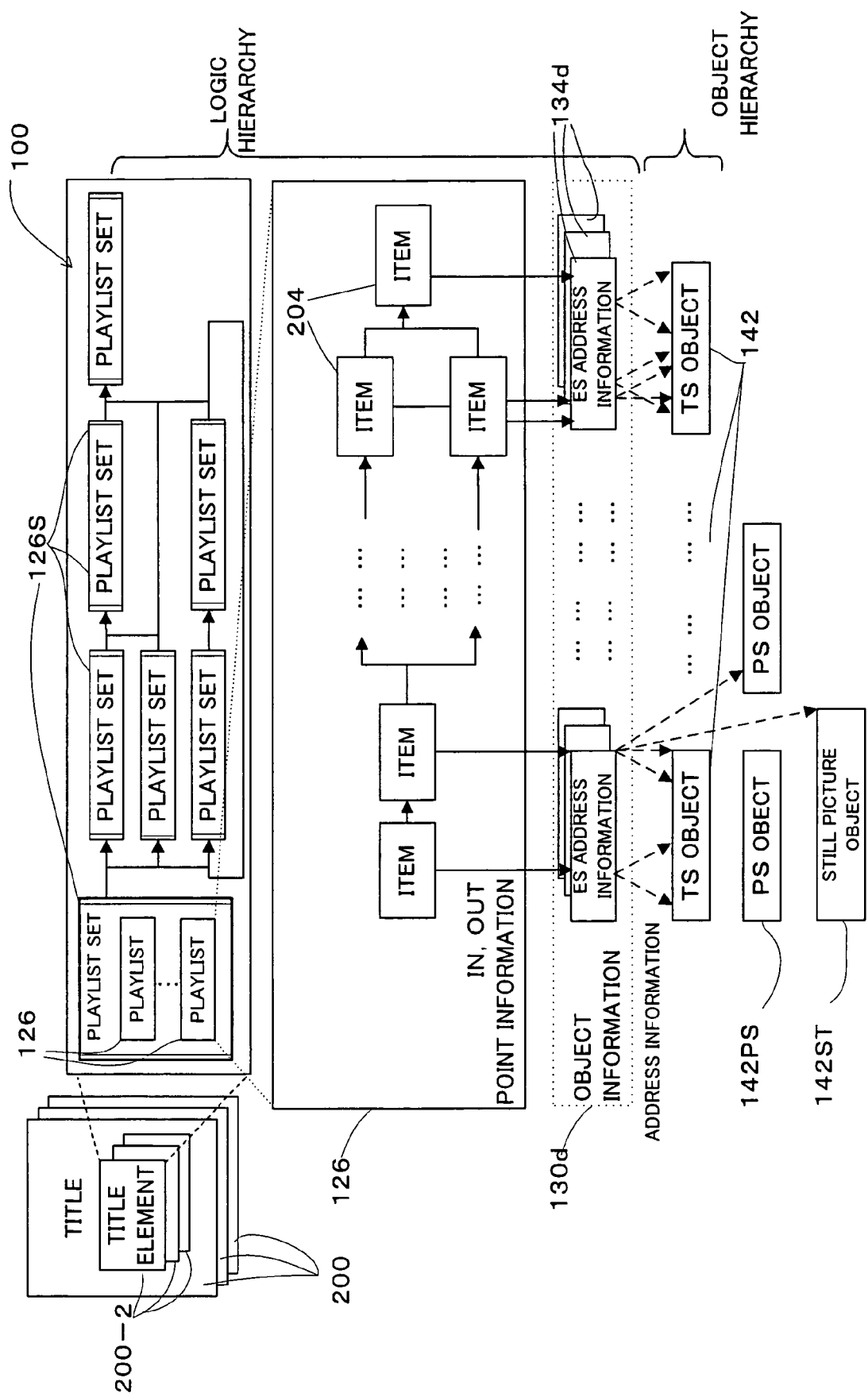
FIG. 13 is a view schematically illustrating a logic structure of data on an optical disc in the embodiment, focusing on development from a logic hierarchy to an object hierarchy or an entity hierarchy.

Next, with reference to FIG. 13, the logical structure of data on the optical disc 100 is discussed. FIG. 13 schematically illustrates the logical structure of data on the optical disc 100, focusing on the development from the logic hierarchy to the object hierarchy or the entity hierarchy.

In FIG. 13, one or more titles 200 that are a logical large unit such as one movie or one TV program are recorded onto the optical disc 100. Each title 200 includes one or more title elements 200-2. Each title element 200-2 is logically made of a plurality of playlist sets 126S. In each title element 200-2, the plurality of playlist sets 126S may have a sequential structure or may have a branch structure.

Incidentally, in the case of a simple logical structure, one title element 200 is made of one playlist set 126S. Furthermore, one playlist set 126S is made of one playlist 126. On the other hand, it is possible to refer to one playlist set 126S by a plurality of title elements 200-2 or a plurality of titles 200.

Each playlist 126 is logically made of a plurality of items (play items) 204. In each playlist 126, a plurality of items 204 may have the sequential structure or may have the branch structure. On the other hand, it is possible to refer to one item 204 by a plurality of playlists 126. The aforementioned in-point information and out-point information recorded on/in the item 204 logically defines the reproduction range of the TS object 142. Finally, the reproduction range of the TS object 142 is physically defined, via the file system, by referring to the object information 130d about the logically defined reproduction range. Here, the object information 130d includes various information to reproduce the TS object 142, such as the attribute information of the TS object 142, the ES address information 134d required for the data search in the TS object 142 and the like (incidentally, the ES map table 134 shown in FIG. 3 includes a plurality of ES address information 134d).

Then, when the information record and reproduce apparatus reproduces the TS object 142 as mentioned below, a physical address to be reproduced in the TS object 142 is obtained from the item 204 and the object information 130d so that a desired elementary stream is reproduced.

Incidentally, the EP (Entry Pass) map including the plurality of ES address information 134d, shown within the object information of FIG. 13, herein indicates an object information table in which the AU table 131 and the ES map table 134 are listed.

Thus, in this embodiment, the in-point information and out-point information recorded on/in the item 204, as well as the ES address information 134d recorded in the ES map table 134 (see FIG. 3) of the object information 130d make it possible to associate the object hierarchy with the logic hierarchy about the reproduction sequence so that the elementary stream is reproduced.

As discussed above, in this embodiment, units of the TS packet 146 are multiplexed and recorded on the optical disc 100. Thereby, the transport stream including a plurality of elementary streams as shown in FIG. 2(b) can be recorded onto the optical disc 100. In this embodiment, in the case that digital broadcasting is recorded onto the optical disc 100, a plurality of programs can be recorded at the same time, within the restriction of the record rate. A record method is employed herein, in which a plurality of programs is multiplexed and recorded for one TS object 142. Now, an explanation is made on an embodiment of the information record reproduction apparatus capable of performing such a record processing.

(Information Record Reproduction Apparatus)

Figure 14:
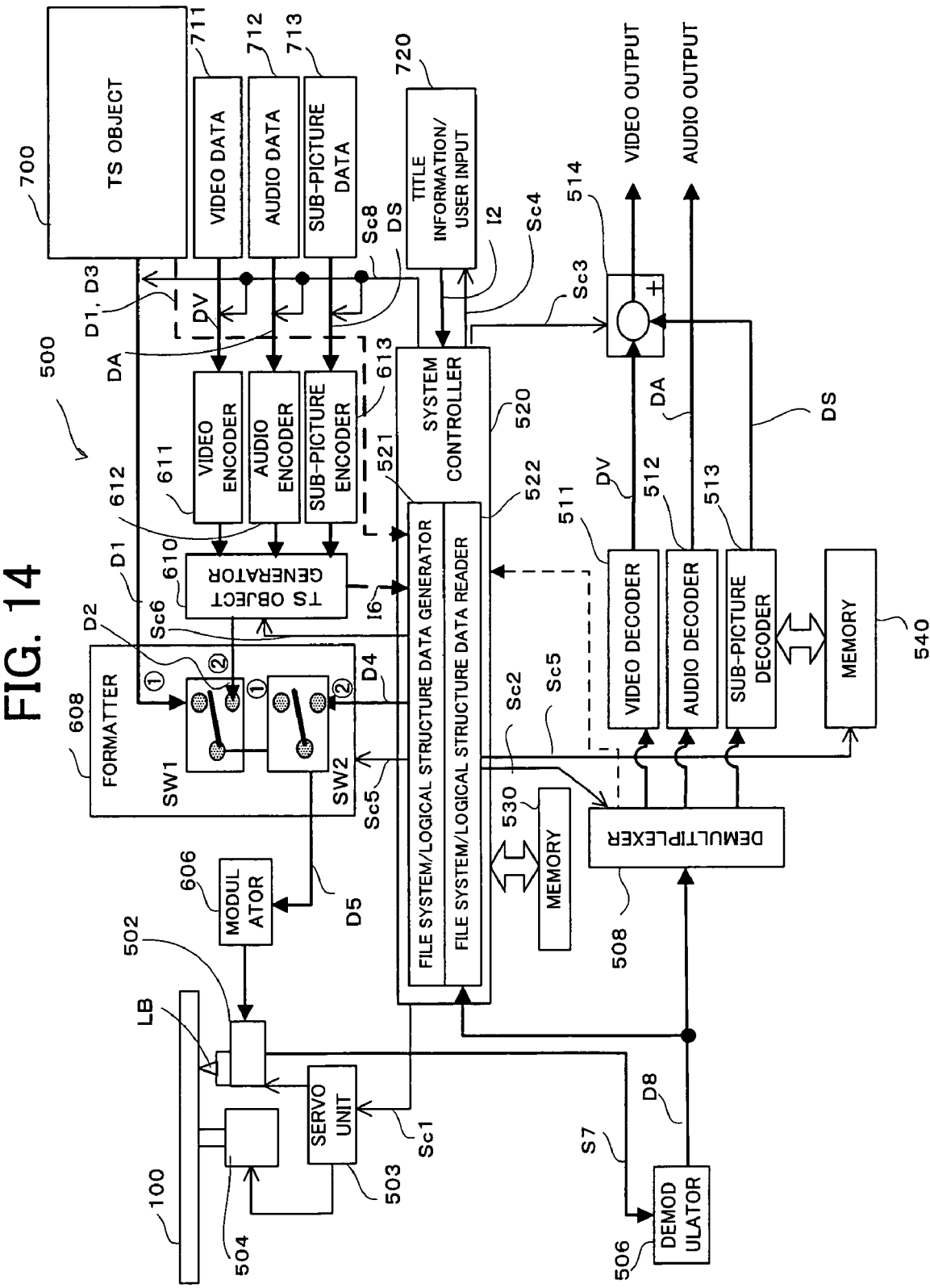
FIG. 14 is a block diagram schematically illustrating an information record reproduction apparatus in the embodiment.

Next, with reference to FIG. 14 to FIG. 19, an embodiment of the information record reproduction apparatus of the present invention is discussed. Here, FIG. 14 is a block diagram of the information record reproduction apparatus, and FIGS. 15 to 19 illustrate the operational flow.

In FIG. 14, the information record reproduction apparatus 500 is roughly divided into a reproduction system and a record system. The information record reproduction apparatus 500 is constructed to record the information onto the optical disc 100 mentioned above and to reproduce the information recorded thereon/therein. In this embodiment, the information record reproduction apparatus 500 is thus for recording and reproduction. Nevertheless, an embodiment of the information record apparatus according to the present invention can be constructed basically with the record system of the information record reproduction apparatus 500 and an embodiment of the information reproduction apparatus according to the present invention can be constructed basically with the reproduction system of the information record reproduction apparatus 500.

The information record reproduction apparatus 500 is provided with: an optical pickup 502; a servo unit 503; a spindle motor 504; a demodulator 506; a demultiplexer 508; a video decoder 511; an audio decoder 512; a sub-picture decoder 513; an adder 514; a still picture decoder 515; a system controller 520; a memory 530; a memory 540; a memory 550; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the demodulator 506, the demultiplexer 508, the video decoder 511, the audio decoder 512, the sub-picture decoder 513, the adder 514, the still picture decoder 514, the memory 540 and the memory 550 mainly constructs the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, a TS object data source 700 (or a PS object data source 700, or a still picture data source 700 such as bit map data, JPEG data and the like); a video data source 711; an audio data source 712; and a sub-picture data source 713 are prepared. Furthermore, the file system/logical structure data generator 521 disposed in the system controller 520 is used mainly in the record system, and the file system/logical structure reader 522 in the system controller 520 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 14 to FIG. 18, a specific structure and the operation of each constitutional element constructing the record system of the information record and reproduction system 500 is explained in each case.

(i-1) In the Case that the Already Generated Object is Used

Figure 15:
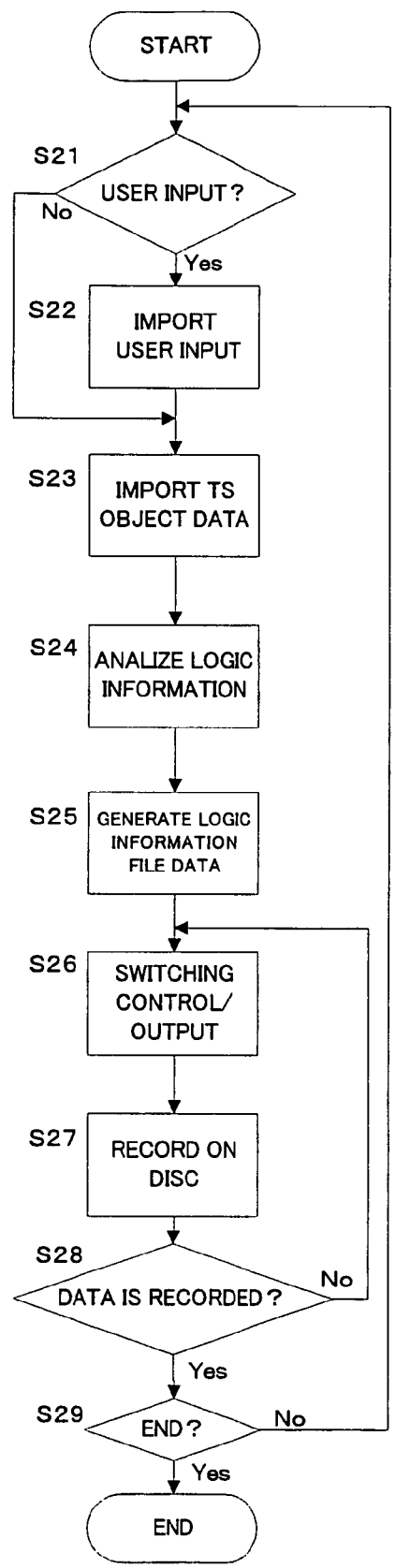
FIG. 15 is a flow chart indicating a recording operation (part 1) of the information record reproduction apparatus in the embodiment.

This case is discussed, with reference to FIG. 14 and FIG. 15.

In FIG. 14, the TS object data source 700 may be made of the memory storage such as a video tape, a memory, for storing the TS object data D1.

Firstly in FIG. 15, each title information (e.g. contents of the playlist etc.) to be logically constructed on the optical disc 100 using the TS object data D1 is inputted into the system controller 520, as the user input I2 such as the title information, via the user interface 720. Then, the system controller 520 imports the user input I2 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23). And the system controller 520 performs the data array analysis (e.g. a record data length and the like) of the TS object data D1, the analysis of each elementary stream structure (e.g. understanding of ES_PID (elementary stream/packet identification number)) and the like, on the basis of the PAT, the PMT and the like packetized with the video data as mentioned above, due to the TS analysis function in the file system/logical structure data generator 521 (step S24).

Next, the system controller 520 makes the file system/logical structure data generator 521 generate the disc information file 110, the playlist information file 120, the object information file 130 and the file system 105 (see FIG. 3), as the logical information file data D4, on the basis of the analysis result of each elementary stream and the TS object data D1 data array, as well as the user input I2 such as the imported title information (step S25). The memory 530 is used to generate this logical information file data D4.

Incidentally, variations in which the data about each elementary stream structure information and the TS object data D1 data array may be prepared in advance are naturally understood or suggested, all of which are encompassed within a scope of the embodiment.

In FIG. 14, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 15, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selection output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding TS object data D1 have not been completely recorded yet, the operational flow returns to the step S26 to continue the recording (step S28: No). Incidentally, there is no preference in the record sequence of the logical information file data D4 and the corresponding TS object data D1.

On the other hand, if the both the logical information file data D4 generated at the step S25 and the corresponding TS object data D1 have been already recorded, a judgement is made on whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Incidentally, the example in FIG. 15 shows that the logical information file data D4 and the corresponding TS object data D1 are outputted at the step S26, after preparing the logical information file data D4 at the step S25. However, it is also possible to output the TS object data D1 and/or record the TS object data D1 onto the optical disc 100 before the step S25, so that the logical information file data D4 is generated and/or recorded after or in parallel with this recording.

Additionally, a PS object data source or a still picture data source may be used instead of the TS object data source 700. In this case, the recording processing the same as in the case of the TS object data D1 as mentioned above is performed for the PS object data, or the sill picture data such as bit map data, JPEG data and the like, instead of the TS object data D1. Furthermore, instead of the TS object 142, the PS object data or the still picture data is stored in the object data file 140. Then, various logic information about the PS object data or the still picture data is generated under control of the system controller 520, and stored in the disc information file 110, the playlist information file 120, the object information file 130 and the like.

(i-2) The Case of Receiving and Recording the Transport Stream on Air

Figure 16:
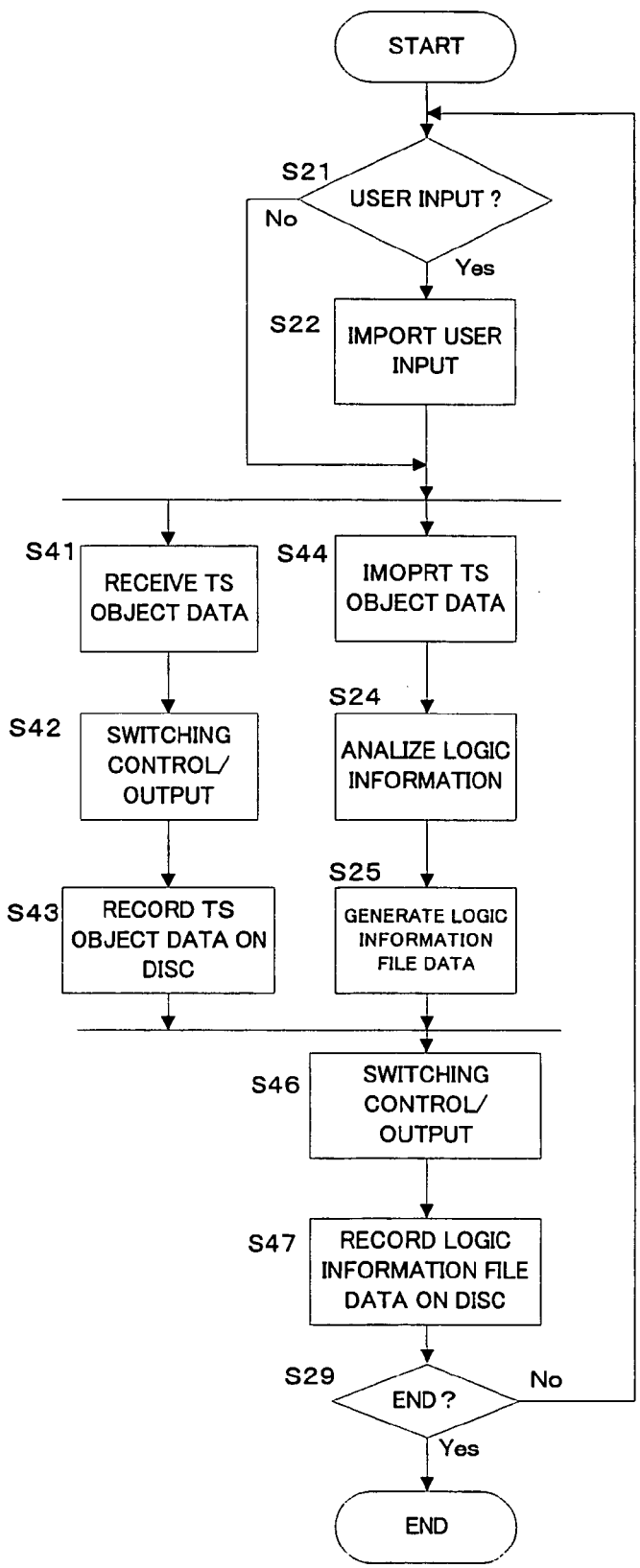
FIG. 16 is a flow chart indicating a recording operation (part 2) of the information record reproduction apparatus in the embodiment.

This case is explained with reference to FIG. 14 and FIG. 16. Incidentally, in FIG. 16, the same steps as those in FIG. 15 have the same step reference numbers, and their explanation is omitted as occasion demands.

Again, in this case, the similar processing is performed, as is "the case of using the already prepared object" described above. Therefore, the following explanation is focused on the differences from this case.

In the case of receiving and recording the transport stream on air, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the belowmentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Incidentally, if all the reception data obtained when broadcasting is once stored into an archive apparatus, and then, if this is used as the object source 700, the same processing as that in "the case of using the already prepared object" will do.

Figure 17:
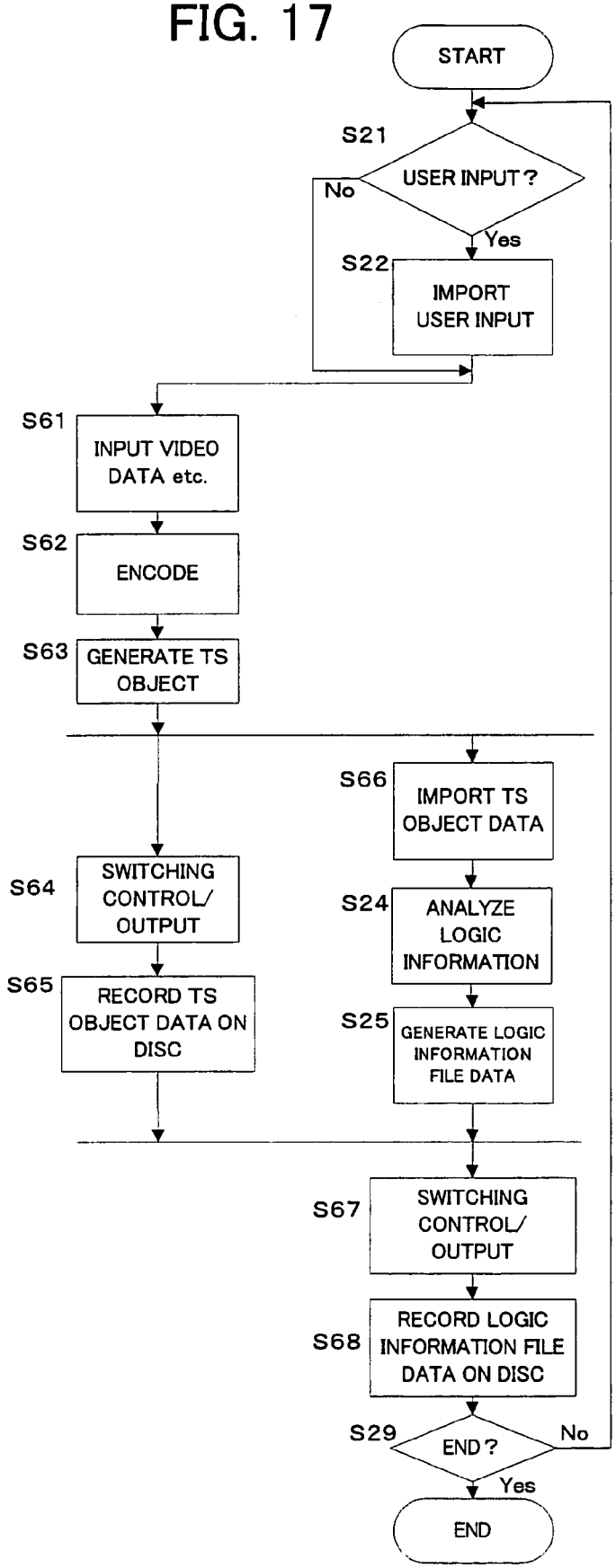
FIG. 17 is a flow chart indicating a recording operation (part 3) of the information record reproduction apparatus in the embodiment.

(i-3) The Case of Recording the Video Data, the Audio Data and the Sub-Picture Data This case is explained with reference to FIG. 14 and FIG. 17. Incidentally, in FIG. 17, the same steps as those in FIG. 15 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted as information 16 from the TS object generator 610 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported that are stored into the memory 530 as the information 16, the file system/logical structure data generator 521 prepares the logical information file data D4 (step S24 and step S25). Then, after the completion of recording a series of the TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input 12 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 18:
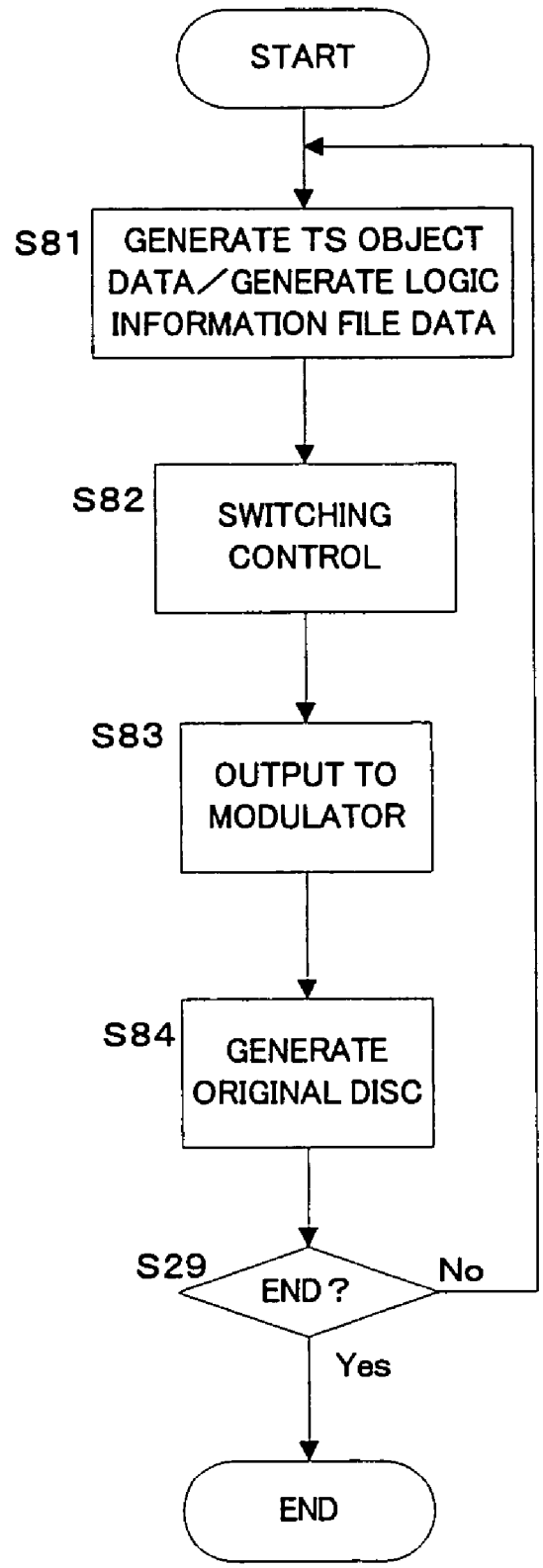
FIG. 18 is a flow chart indicating a recording operation (part 4) of the information record reproduction apparatus in the embodiment.

This case is explained with reference to FIG. 14 and FIG. 18. Incidentally, in FIG. 18, the same steps as those in FIG. 15 have the same step reference numbers, and their explanation is omitted as occasion demands.

In this case, by combining the above described record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 14 and FIG. 19.

In FIG. 14, via the user interface 720, the title to be reproduced from the optical disc 100, its reproduction condition and the like are inputted to the system controller 520, as the user input 12 such as the title information and the like. In this case, under control of the control signal Sc4 from the system controller 520, the input processing suitable for the content to be reproduced, such as a selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, depending on whether the TS object data is included as the multiplexed information part in the demodulated data D8, or whether the still picture data is included, or whether both data are included, the shift switch Sw3 is shifted to ① side (demultiplexer 508 side) or shifted to ② side (still decoder 515 side), under control of the control signal Sc10 from the system controller 520. Thereby, the TS object data is selectively supplied to the demultiplexer 508, and the still picture data is selectively supplied to the still picture decoder 515.

Then, as for the TS object data included as the multiplexed information part in the demodulated data D8, the demultiplexer 508 demultiplexes the TS object data, under control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, the video data DV, the audio data DA and the sub-picture data DS are decoded, respectively. In this case, the sub-picture data DS is supplied to the adder 514 via the memory 540. The sub-picture data DS is outputted from the memory 540, selectively or at a predetermined timing, under control of the control signal Sc5 from the system controller 520, so as to be super-imposed on the video data DV, if needed. That is, in comparison with a case that the sub-picture data outputted from the sub-picture decoder 513 is directly super-imposed, it is easy to control the timing of the super-imposing, or to judge the need for the super-imposing. For example, under output control of the control signal Sc5, it is possible to select whether or not a caption using the sub-picture is displayed over the video, or whether or not a menu screen using the sub-picture is displayed.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

In the case that the still picture data is included in the demodulated data D8, the still picture data is supplied to the still picture decoder 515, via the shift switch Sw3 controlled by the control signal Sc10 from the system controller 520, instead of or in addition to such a reproduction operation or processing of the video data DV or the sub-picture data DS. Then, the still picture data such as the decoded bit map data, JPEG data and the like is added to the adder 514 via the shift switch Sw4, without subjected to any processing, under control of the control signal Sc11 from the system controller 520. Alternatively, it may be temporarily stored in the memory 550 via the shift switch Sw4. The still picture data is outputted from the memory 550, selectively or at a predetermined timing, under control of the control signal Sc12 from the system controller 520, and then supplied to the adder 514 via the shift switch Sw5. Thereby, if needed, the video data DV or the sub-picture data DS is super-imposed over the still picture data or vice versa. That is, in comparison with a case that the still picture data outputted from the still picture decoder 515 is directly super-imposed, it is easy to control the timing of the super-imposing, or to judge the need for the super-imposing. For example, under output control of the control signal Sc12, it is possible to select whether or not a still picture such as a menu screen or a window screen using the still picture data or a still picture as a background image using the still picture data is displayed on the video or the sub-picture.

Additionally, under control of the control signal Sc13 from the system controller 520, the still picture data may be outputted via another route (not shown), with the aid of the shift switch Sw5 shifted to ② side. Alternatively, no still picture data may be outputted from the shift switch Sw5 shifted to ② side.

Here, the specific example of a reproduction processing routine by the system controller 520 is explained with reference to a flow chart of FIG. 19.

Figure 19:
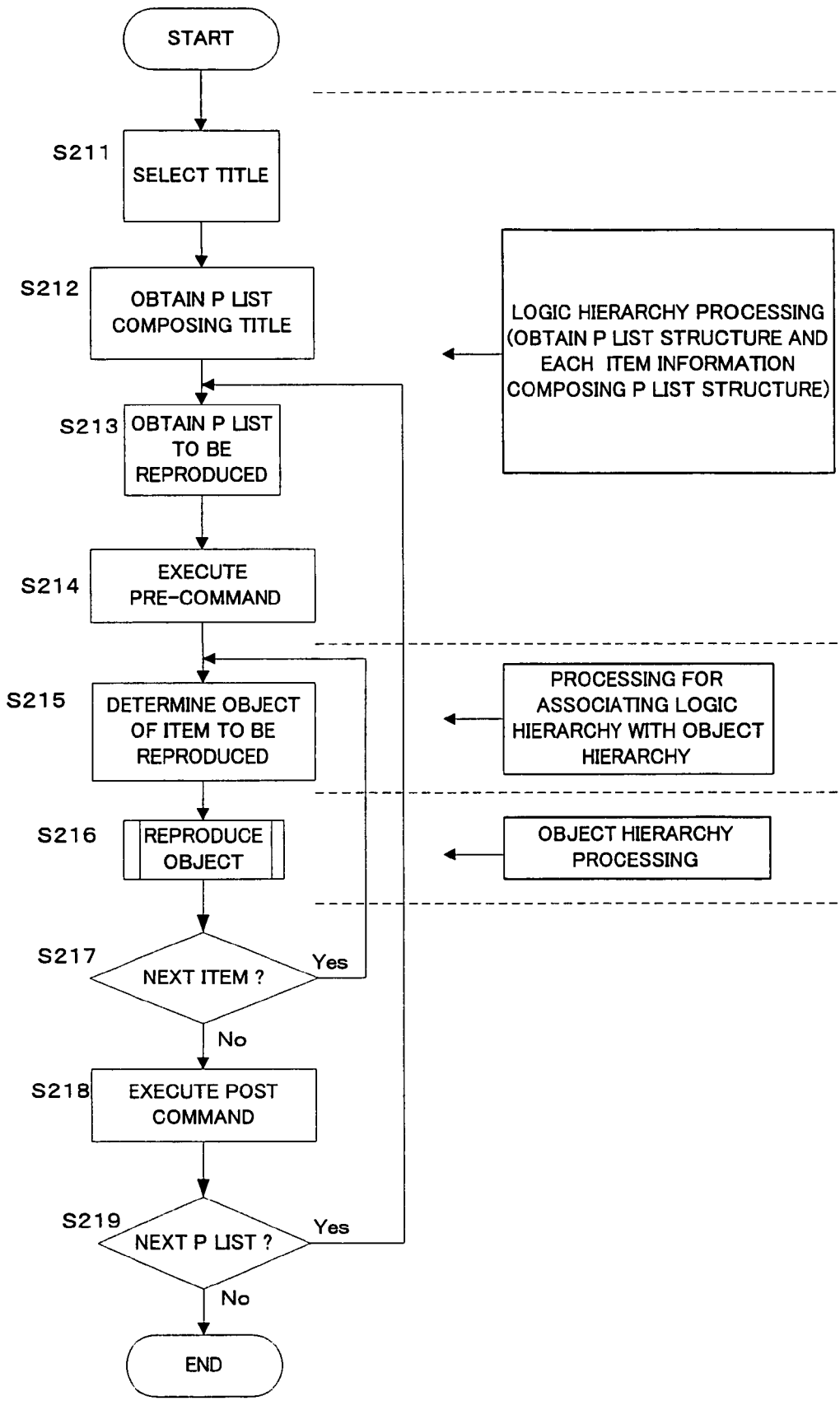
FIG. 19 is a flow chart indicating a reproduction operation of the information record reproduction apparatus in the embodiment.

In FIG. 19, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. Here, an explanation is made on the operational flow after obtaining the total number of the total titles from the disc general information 112 in the disc information file 110 and then choosing or selecting one title from among them.

Firstly, the choice or selection of the title is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (see FIG. 4) may be selected from among a whole title elements 200-2 composing the title 200, with the aid of an external input operation by the user with using a remote controller and the like. One title element 200-2 may be selected automatically depending on a system parameter or the like adjusted for the information record reproduction apparatus 500.

Then, contents of a plurality of playlists 126 composing a playlist set 126S corresponding to the selected title 200 (title element 200-2) are obtained. Here, as a processing at a logic hierarchy, the information about the each playlist 126 structure and each item 204 composing each playlist 126 (see FIG. 5, FIG. 6 and FIG. 13) is obtained (step S212).

Then, contents of the playlist 126 to be reproduced is obtained from among a plurality of playlists 126 obtained at step S212. For example, herein, the reproduction is started from a playlist #1, and the contents of the corresponding playlist 126 is obtained (step S213). The contents of the playlist 126 may be one or more playlist elements 126-2 (see FIG. 5), which are obtained by the obtaining processing at step S213.

Then, the pre-command 126PR (see FIG. 5) included in this playlist 126 is executed (step S214). Incidentally, it is possible for the pre-command 126PR to select one playlist 126 from among a plurality of playlists 126 with a certain relationship to each other, which composes the playlist set 126S. If the playlist element 126-2 composing the playlist 126 does not have the pre-command 126PR, this processing is omitted.

Then, the TS object 142 (see FIG. 3 and FIG. 10) to be reproduced is determined (step S215), on the basis of the item 204 (see FIG. 5 to FIG. 7) identified by the playlist 126 obtained at step S213. More specifically, on the basis of the item 204, the object information file 130 (see FIG. 3) relating to the TS object 142 as the reproduction target is obtained and a stream number, address and the like of the TS object 142 to be reproduced are identified.

Incidentally, in this embodiment, also the belowmentioned AU (Association Unit) information 132I and PU (Presentation Unit) information 302I are obtained as the information stored in the object information file 130. On the basis of these informations, the aforementioned logic hierarchy is associated with the object hierarchy (see FIG. 13).

Then, the reproduction of the TS object 142 determined at step S215 is actually started. That is, on the basis of the processing at the logic hierarchy, the processing at the object hierarchy is started (step S216).

During the reproduction of the TS object 142, a judgement is made on whether or not the next item 204 composing the playlist 126 to be reproduced exists (step S217). Then, insofar as the next item 204 exists (step S217: Yes), the process goes back to the step S215 to repeat the aforementioned determination and the reproduction of the TS object 142.

On the other hand, at the judgement at step S217, if it is judged that the next item 204 does not exist (step S217: No), the post command 126PS (see FIG. 5) corresponding to the presently executed playlist 126 is executed (step S218). Incidentally, if the playlist element 126-2 composing the playlist 126 does not have the post command 126PS, this processing is omitted.

Then, a judgement is made on whether or not the next playlist 126 composing the selected title 200 exists (step S219). If exists (step S219: Yes), the process goes back to the step S213 to repeat the processings following obtaining the playlist 126 to be reproduced.

On the other hand, at the judgement at step S219, if it is judged that the next playlist 126 does not exist (step S219: No), i.e. if the all playlists 126 to be reproduced corresponding to the title 200 selected at step S211 are completely reproduced, a series of reproduction operations or processings is terminated.

As discussed above, the information record reproduction apparatus 500 in this embodiment reproduces the optical disc 100.

Particularly in this embodiment, (i) with regard to the structure and operation of the record system mentioned above, the recording is performed in such a manner that the dual mono audio stream is included in the plurality of audio streams in the transport stream shown in FIG. 2(b). Furthermore, the recording is performed in such a manner that the channel designation information is added to the dual mono audio stream in the ES map table.

Particularly in this embodiment, (ii) with regard to the structure and operation of the reproduction system, the "stream switching" between the dual mono audio stream and audio streams in another format such as AC-3 or the like is performed by referring to the ES map table via the PU table in the AU table, as discussed below. Furthermore, the "in-stream audio switching" in one dual mono audio stream or the like is performed by referring to the channel designation information included in the ES map table, as discussed below.

Incidentally, in the present invention, the dual mono audio stream as an example of "the plural-channels stream" according to the present invention may be included in not only the transport stream shown in FIG. 2(b), but also the program stream shown in FIG. 2(a) or FIG. 2(c). Furthermore, as discussed below, it is possible to perform not only the "stream switching" between the dual mono audio stream and the AC-3 audio stream or the like, but also the "in-stream audio switching" in one dual mono audio stream. That is, the present invention is applicable to any stream format shown from FIG. 2(a) to FIG. 2(c). In the simplest case, the video stream and the sub-picture stream does not exist in the program stream or transport stream as an example of the "whole stream" shown in FIG. 2(a) to FIG. 2(c). In addition to this simplest case, the present invention is applicable to the case that the plurality of audio streams exists. In any case, the present invention brings a substantial effect allowing both the "stream switching" and the "in-stream audio switching".

(Stream Switching and In-Stream Audio Switching)

Figure 20:
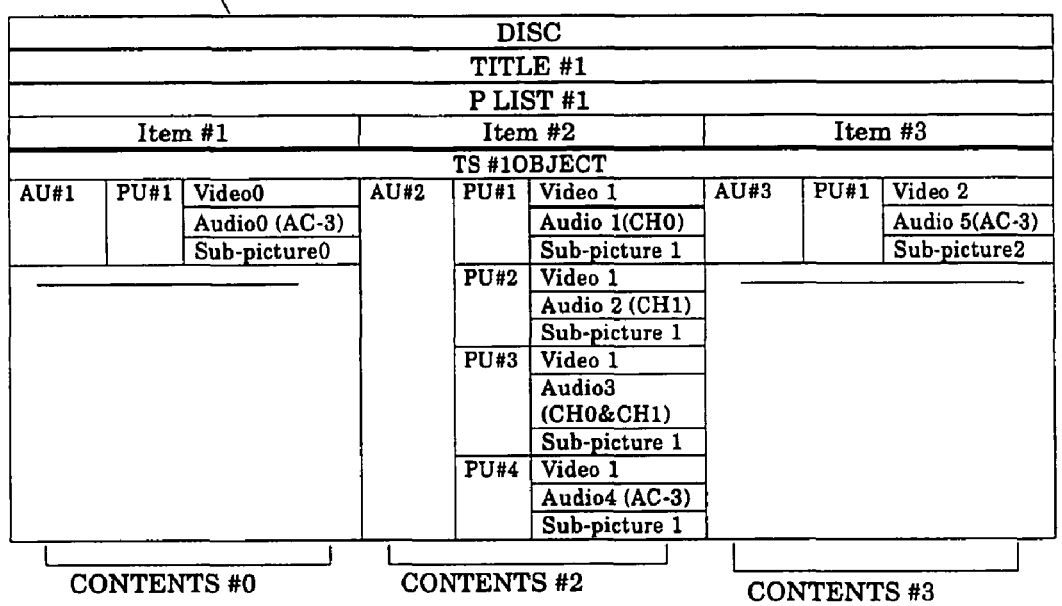
FIG. 20 is a conceptual diagram showing a disc structure including a title part compatible to the stream switching in the embodiment.
Figure 22:
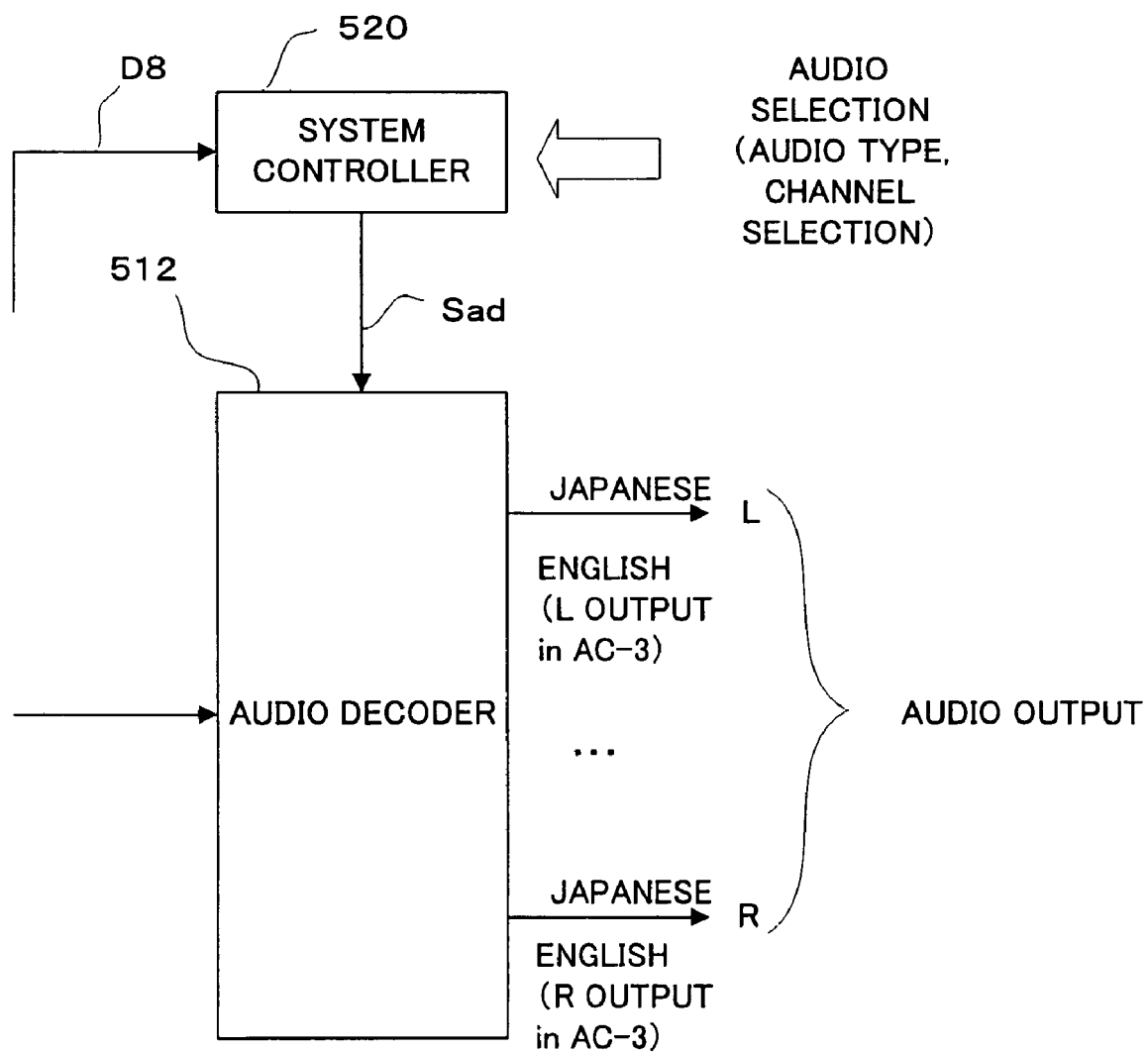
FIG. 22 is a block diagram illustrating a detail of an audio decoder provided for the information record reproduction apparatus shown in FIG. 14.
Figure 23:
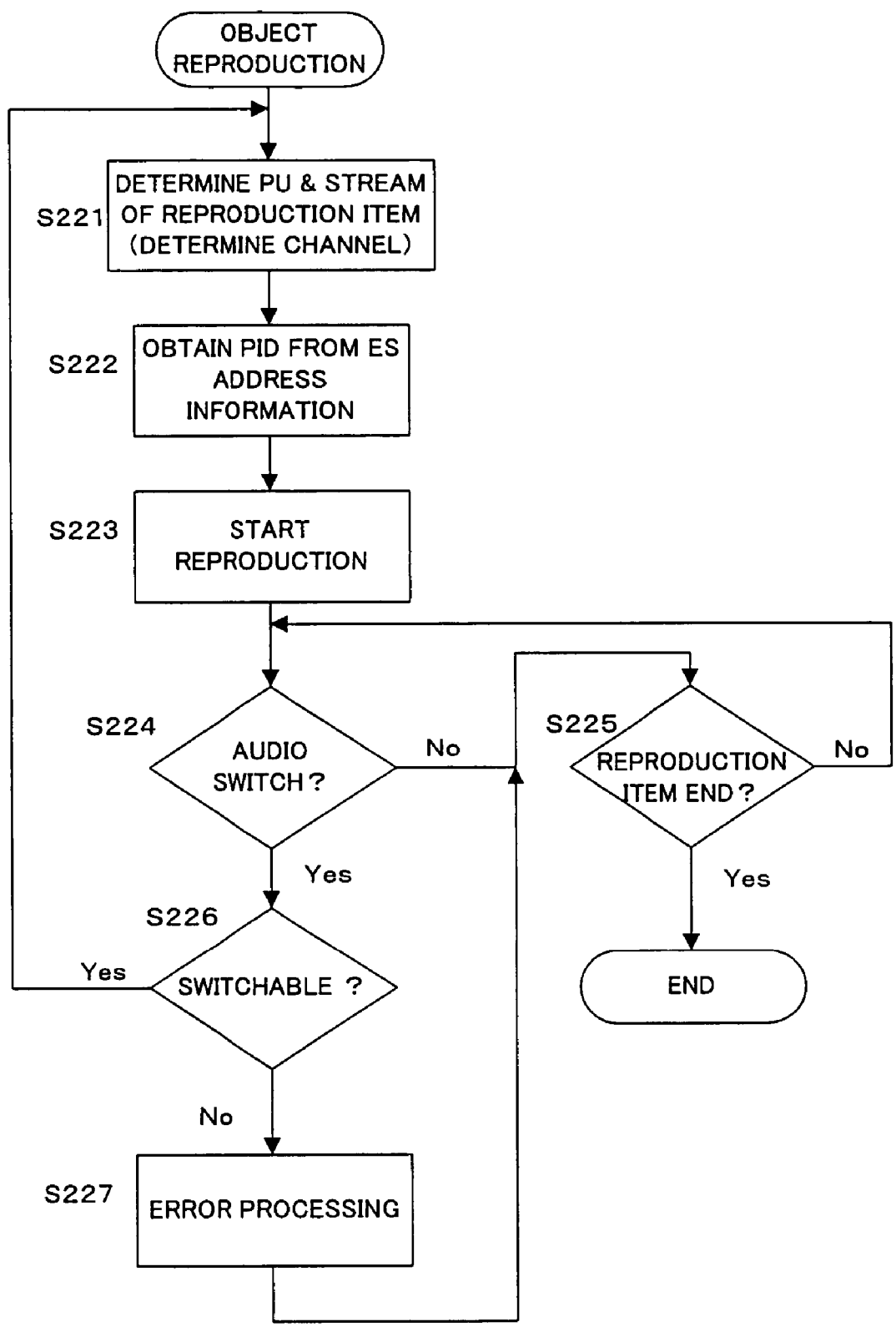
FIG. 23 is a flow chart showing an operational flow of the stream switching and the in-stream audio switching in the information reproduction apparatus in the embodiment.

Now, with reference to FIG. 20 to FIG. 23, an explanation is made on the stream switching among the plurality of audio streams and, the in-stream audio switching in the dual mono audio stream. FIG. 20 conceptually illustrates a disc structure including a title part which can perform the stream switching. FIG. 21 conceptually illustrates data structures in an AU table and an ES table. FIG. 22 is a block diagram showing a detail of the audio decoder provided for the information record reproduction apparatus shown in FIG. 14. FIG. 23 is a flow chart showing an operational flow of the stream switching and the in-stream audio switching in the information record reproduction apparatus.

As shown in FIG. 20, with regard to the object data part of the item (Item) #1 recorded onto the optical disc 100 in this embodiment, there are AU #1 as an example of the "related group" according to the present invention and only one PU, i.e. PU #1, as an example of the "reproduction output group" according to the present invention. With regard to the object data part of the item #2, there are AU #2, and four PU's, i.e. PU's #1 to #4. With regard to the object data part of the item #3, there are AU #3 and only one PU, i.e. PU #1.

Furthermore, audio streams included in one PU #1 corresponding to items #1 to #3 are all AC-3 audio streams.

Therefore, item #1 is not compatible to the stream switching of the audio streams, but compatible solely to the reproduction of AC-3 audio stream. AC-3 audio stream are reproduced and outputted as contents #0 such as a movie with surround sound and caption, respectively with a video stream (Video 0 in the figure) and a sub-picture stream (Sub-picture 0 in the figure), which belong to the same PU.

Similarly, item #3 is not compatible to the stream switching of the audio streams, but compatible solely to the reproduction of AC-3 audio stream. AC-3 audio stream are reproduced and outputted as contents #3 such as a movie with surround sound and caption, respectively with a video stream (Video 2 in the figure) and a sub-picture stream (Sub-picture 2 in the figure), which belong to the same PU.

On the contrary, audio stream included in PU#1, one of four PU's corresponding to item #2, are dual mono audio stream and the channel number thereof (available channel data) is "CH0". Audio stream included in PU#2, another one of four PU's corresponding to item #2, are dual mono audio stream as in the case of PU#1, and the channel number (available channel data) is "CH1" different from the case of PU#1. Audio stream included in PU#3, another one of four PU's corresponding to item #2, are dual mono audio stream as in the cases of PU#1 and PU#2, and the channel number (available channel data) is "CH0 & CH1 (both channel numbers)" different from the case of PU#1 or PU#2. Audio stream included in PU#4, another one of four PU's corresponding to item #2, are AC-3 audio stream the same as AU#1 and AU#3.

Dual mono audio stream or AC-3 audio stream are reproduced and outputted as contents #3 such as a movie with surround sound and caption, respectively with a video stream (Video 1 in the figure) and a sub-picture stream (Sub-picture 1 in the figure), which belong to the same PU. Incidentally, at least one of the video stream and the sub-picture stream may be varied for each PU. For the simplicity, however, these streams herein are identical with regard to item #2.

As shown in FIG. 21, the logical structure of the AU, PU and other information of item #2 in FIG. 20 is composed of an AU table 131 and an ES map table 134.

In this specific example as shown in the upper part of FIG. 21, the AU table 131 may have a structure in which each field can add a required number of tables. For example, if there are four AU's, the AU table 131 may have the structure in which the corresponding field increased up to four. In the AU table 131, there are stored "AU table general information" in which quantity (i.e. number) of AU, pointers to each AU and the like are recorded, and "other information".

An index number of the corresponding ES map table 134 is written, as AU information 132I indicating an ES table index #m (ES_table Index #m) in each PU #m corresponding to each AU #n, in the AU table 131. Here the "AU" may be a unit corresponding to a program in the TV broadcasting field, as mentioned above. In this AU, one or more PU's as reproduction units are included. Furthermore, the "PU" is a set of elementary streams switchable to each other and included in each AU as mentioned above. An ES table index number corresponding to each PU is identified by the PU information 302I. For example, in the case that AU's compose multi-view contents, a plurality of PU's are stored in the AU, and pointers to a plurality of elementary stream packet IDs indicating packets composing content of each view are stored in each PU. These pointers indicate index numbers in the ES map table 134, as mentioned below.

In this specific example as shown in the lower part of FIG. 21, "ES map table general information", a plurality of index # m (m=1, 2, . . . ) and "other information" are stored for each field in the ES map table 134.

In the "ES map table general information", an ES map table size, a total index number and so on are described.

The "index #m" include an elementary stream packet ID (ES_PID) for all elementary streams used for the reproduction, the corresponding index numbers and elementary stream address informations.

For example in this embodiment, if the elementary stream is a video stream of MPEG2 as mentioned above, only a TS packet number of a head of the I picture and the corresponding display time are described, as this address information, in the ES map table 134, for saving the data volume.

Owing to this construction, the elementary stream packet ID (ES_PID) of the actual elementary stream can be acquired from the index number of the ES map table 134 designated from the AU table 131. Furthermore, since the address information of the elementary stream corresponding to the elementary stream packet ID can be acquired at the same time, object data can be reproduced on the basis of these informations.

Particularly in this embodiment, as shown in FIG. 21, on the basis of the AU information 132I about AU#2 in the AU table 131, a plurality of PU's are grouped as PU's being switchable to each other. In the PU information 302I which is converted to a form of the PU table, index numbers in the ES map table 134, belonging to PU#1, PU#2, PU#3 and PU#4, respectively, are described for each stream.

More specifically, in FIG. 21, with regard to PU#1, ES_PID numbers of packets composing the video stream can be identified with a reference to the ES map table 134 corresponding to index #1 recorded as the PU information 302I in the AU table 131 (the ES_PID value is "10" in this case). Similarly, with regard to PU#1, ES_PID numbers of packets composing dual mono audio stream can be identified with a reference to the ES map table 134 corresponding to index #2 recorded as the PU information 302I in the AU table 131 (the ES_PID value is "20" in this case). Furthermore, with regard to PU#1, ES_PID numbers of packets composing sub-picture stream can be identified with a reference to the ES map table 134 corresponding to index #6 recorded as the PU information 302I in the AU table 131 (the ES_PID value is "31" in this case).

In the embodiment of FIG. 21, with regard to PU#2, ES_PID numbers of packets composing video stream can be identified with a reference to the ES map table 134 corresponding to index #1 recorded as the PU information 302I in the AU table 131 (the ES_PID value is "10" in this case). Similarly, with regard to PU#2, ES_PID numbers of packets composing dual mono audio stream can be identified with a reference to the ES map table 134 corresponding to index #3 recorded as the PU information 302I in the AU table 131 (the ES_PID value is "20" in this case). Furthermore, with regard to PU#2, ES_PID numbers of packets composing sub-picture stream can be identified with a reference to the ES map table 134 corresponding to index #6 recorded as the PU information 302I in the AU table 131 (the ES_PID value is "31" in this case).

In the embodiment of FIG. 21, with regard to PU#3, ES_PID numbers of packets composing video stream can be identified with a reference to the ES map table 134 corresponding to index #1 recorded as the PU information 3021 in the AU table 131 (the ES_PID value is "10" in this case). Similarly, with regard to PU#3, ES_PID numbers of packets composing dual mono audio stream can be identified with a reference to the ES map table 134 corresponding to index #4 recorded as the PU information 302I in the AU table 131 (the ES_PID value is "20" in this case). Furthermore, with regard to PU#3, ES_PID numbers of packets composing sub-picture stream can be identified with a reference to the ES map table 134 corresponding to index #6 recorded as the PU information 302I in the AU table 131 (the ES_PID value is "31" in this case).

In the embodiment of FIG. 21, with regard to PU#4, ES_PID numbers of packets composing video stream can be identified with a reference to the ES map table 134 corresponding to index #1 recorded as the PU information 302I in the AU table 131 (the ES_PID value is "10" in this case). Similarly, with regard to PU#4, ES_PID numbers of packets composing AC-3 audio stream can be identified with a reference to the ES map table 134 corresponding to index #5 recorded as the PU information 302I in the AU table 131 (the ES_PID value is "21" in this case). Furthermore, with regard to PU#4, ES_PID numbers of packets composing sub-picture stream can be identified with a reference to the ES map table 134 corresponding to index #6 recorded as the PU information 302I in the AU table 131 (the ES_PID value is "31" in this case).

In the ES map table 134, "CH#0" is assigned with regard to index #2 indicating ES_PID's of dual mono audio stream, on the basis of the available channel data as an example of the "channel designation information" according to the present invention.

On the other hand, in the ES map table 134, "CH#1" is assigned with regard to index #3 indicating ES_PID's of dual mono audio stream, on the basis of the available channel data.

Furthermore, in the ES map table 134, "CH#1&CH1 (both channels)" are assigned with regard to index #4 indicating ES_PID's of dual mono audio stream, on the basis of the available channel data.

As shown in FIG. 22, the system controller 520 obtains the AU table 131 and the ES map table 134 shown in FIG. 21, as a part of the object information file 130 which is a not-multiplexed information part included in the demodulated data D8. In response to the user's operation through a remote controller or control panel or in response to preset speaker system parameters or an automatic input of speaker system parameters in a plug-in-play, the audio control signal Sad to indicate the audio data to be reproduced and outputted is outputted to the audio decoder 512.

Audio stream to be reproduced and outputted is of a format other than the dual mono format, such as AC-3 format, as in the case of PU#1 belonging to AU#1 or AU#3 shown in FIG. 20, the system controller 520 outputs to the audio decoder 512 the audio control signal Sad designating audio stream to be reproduced and outputted. Then, the audio decoder 512 reproduces and outputs audio stream of AC-3 format for example, as one of a plurality of audio streams reproducible from audio packets inputted from the demultiplexer 508, in accordance with the audio control signal Sad. For example, in the case of AC-3 audio stream for 5 channels, the audio output is supplied from five terminals corresponding to five channels to five speakers.

Furthermore, in the case that audio stream to be reproduced and outputted is dual mono audio stream as in the case of PU#1, PU#2 or PU#3 belonging to AU#2 shown in FIG. 20 and FIG. 21, the system controller 520 outputs to the audio decoder 512 the audio control signal Sad designating the audio stream to be reproduced and outputted, and further designating the channel number in the audio stream. Then, the audio decoder 512 reproduces and outputs dual mono audio stream, as one of a plurality of audio streams reproducible from audio packets inputted from the demultiplexer 508, in accordance with the audio control signal Sad. The main audio which may be Japanese sound and the sub-audio which may be English sound included in the dual mono audio stream are selectively reproduced and outputted on the basis of the available channel data. For example, a channel (CH0) for Japanese main audio is designated on the basis of the available channel data, the audio information indicating the Japanese main audio is reproduced and outputted from both a left (L) speaker output terminal and a right (R) speaker output terminal, in response to the audio control signal Sad. Furthermore, for example, if a channel (CH1) for English sub-audio is designated on the basis of the available channel data, the audio information indicating the English sub-audio is reproduced and outputted from both a left (L) speaker output terminal and a right (R) speaker output terminal, in response to the audio control signal Sad. Still furthermore, for example, if channels (CH0&CH1) for the main audio and the sub-audio are designated on the basis of the available channel data, one of the main audio and the sub-audio is reproduced and outputted from a left (L) speaker output terminal and the other is reproduced and outputted from a right (R) speaker output terminal, in response to the audio control signal Sad.

As mentioned above, the PU information 302I which is converted to a form of PU table in the AU table 131, overlappingly registers the same ES_PID corresponding to dual mono audio stream, relative to a plurality of switchable PU's in one AU, as for dual mono audio stream. In each index of the ES map table 134 corresponding to these PU's, the available channel data, which designates channel numbers different from each other among overlappingly registered dual mono audio stream, is registered. From these structure, the system controller 520 of the information reproduction apparatus can perform the stream switching among different audio streams and the in-stream audio switching in the same dual mono audio stream, as a processing in almost the same logic hierarchy, just with a reference to the AU table 131 and the ES map table 134 as logic informations. That is, at the system controller 520 side, it is sufficient to generate the audio control signal Sad for designating the audio stream to be reproduced and the channel number in the case of dual mono audio stream and to output the audio control signal Sad to the audio decoder 512, in any switching style. Furthermore, the audio decoder 512 side, it is sufficient to selectively output a specific audio stream in the plurality of audio streams, or selectively output the audio information of the specific channel in the case of dual mono audio streams, in any switching style.

Consequently, during the reproduction of the optical disc 100, it is possible to perform a desired stream switching or in-stream audio switching by a relatively simple operation of the information record reproduction apparatus 500 as mentioned above, in response to the user's operation through the remote controller or the control panel, without any special attention to whether the stream switching or the in-stream audio switching is performed.

Now, with reference to FIG. 23, a further explanation is made on the reproduction operation including the switching operation of the information record reproduction apparatus 500 (see FIG. 14), relating to the stream switching and the in-stream audio switching discussed with reference to FIG. 20 to FIG. 22. The audio switching operation shown in FIG. 23 is performed mainly under control of the system controller 520, as a part of the object reproduction process (step S216) in the title reproduction operation already discussed with reference to FIG. 19.

Firstly in FIG. 23, the AU table 131 and the ES map table 134 in the object information file 130 already stored as a part of the demodulated signal D8 in the memory 530 is referred to. More specifically, the PU information 302I which is converted to a form of the PU table in the AU table 131 is referred to, and then the PU to be reproduced is selected from among the plurality of PU's composing the item to be reproduced, and the video stream, audio stream and sub-picture stream to be reproduced (see FIG. 20 and the upper part of FIG. 21) is selected (step S221). Furthermore, the packet number corresponding to the stream to be reproduced (see the lower part of FIG. 21) is obtained (step S222), with a reference to the ES address information for each index corresponding to each stream in the ES map table 134. If the PU to be reproduced includes dual mono audio stream, the PU corresponding to the main audio channel number (CH0), which is a preset channel number by default, is selected by default from among the plurality of PU's composing the item to be reproduced. Alternatively, if the audio selection is performed through the user's input to output the sub-audio for example before the reproduction, the PU corresponding to the audio selection is selected. Then, the available channel data (see the lower part of FIG. 21) indicating the channel number in the ES map table 134 is obtained, as the available channel data corresponding to the PU selected as such.

Then, the reproduction of the packet having the packet number obtained as such is started (step S223). That is, the reproduction of the video stream, the audio stream and the sub-picture stream, which belong to the PU selected to be reproduced, is started. For example, in the case of the reproduction of item #1 shown in FIG. 20, the video stream and the sub-picture stream are reproduced with the AC-3 audio stream. Furthermore, in the case of the reproduction of item #2 shown in FIG. 20, the video stream and the sub-picture stream are reproduced with the dual mono audio stream or AC-3 audio stream. In this case, since the ES_PID in the ES map table is designated via the PU information 302I, it is sufficient for the system controller 520 (see FIG. 14) to generate the audio control signal Sad in accordance with this ES_PID. Furthermore, if the PU to be reproduced includes any dual mono audio stream, since the available channel data in the ES map table is designated via the PU information 302I, it is sufficient for the system controller 520 to generate the audio control signal Sad in accordance with the available channel data.

Once the reproduction is started as mentioned above, it is monitored whether the user input to order the "audio switching" is executed via the user interface 720 such as a remote controller or a panel switch (step S224). This monitoring is performed continuously or consecutively in a regular or irregular cycle, unless the reproduction is to be terminated (step S225: No) because of the completion of reproduction of the presently reproduced item, or because of the input such as a reproduction end command, and so on.

At this timing, if the user's input to order the audio switching is executed (step S224: Yes), the AU table 131 already stored as a part of the demodulated signal D8 in the memory 530 is referred to, so that a judgement is made on whether or not the "audio switching" can be performed in the presently reproduced item (step S226). Specifically, a judgement is made on whether or not the plurality of PU's exists in the AU corresponding to the presently reproduced item. For example, in the case of item #1 or #3 shown in FIG. 20, the plurality of switchable PU's does not exist in the AU, and thereby it is judged as not-switchable. On the other hand, in the case of item #2 shown in FIG. 20 for example, the plurality of switchable PU's exists in the AU, and thereby it is judged as switchable.

As a result of this judgement, if it is not switchable (step S226: No), a predetermined kinds of error processing is performed (step S227), and then the process flow goes back to step S224 via step S225. This error processing may be achieved by displaying and outputting an error massage, such as "audio switching is not available!" or by phonetically outputting the same error message.

On the other hand, as a result of this judgement, if it is switchable (step S226: Yes), the process flow goes back to step S221, so that the AU map table 131 and the ES map table 134 are referred to, and the following processings including obtaining the packet number are repeated. In this case, the ES_PID of the audio stream to be reproduced after the stream switching or the in-stream audio switching is identified. Furthermore, if the audio stream to be reproduced after the switching is of a dual mono format, the available channel data in the ES map table 134 is referred to, so that the channel number of the audio stream to be reproduced after the switching is identified, as well as the identification of the audio stream itself. Specifically, the channel number is identified as "CH0", "CH1" or "CH0 & CH1". Then, the reproduction of the identified audio stream is started. That is, this means that the stream switching or the in-stream audio switching is performed.

Then, during the monitoring at step S224, it is judged that the reproduction is to be terminated because of the completion of the item reproduction, or because of the input of the reproduction end command and so on (step S225: Yes), a series of processings relating to the reproduction of the item including the audio switching is terminated. Then, the processes from step 217, subsequent to step S216 shown in FIG. 19, are repeated.

Incidentally, in this embodiment, the stream switching or the in-stream audio switching is performed in response to the user's input to order the "audio switching". Nevertheless, the switching may be performed in response to anything other than the user's operation, such as conditional branch in an interactive reproduction.

Thus, according to the present invention, the plurality of audio streams includes dual mono audio stream, and the PU information 302I defines each PU so that these audio streams overlappingly belong to the plurality of PU's. With regard to the plurality of PU's to which dual mono audio stream overlappingly belong, the available channel data is added to the corresponding index in the ES map table. Furthermore, contents of the available channel data (CH0, CH1, or CH0&CH1) are different among the plurality of PU's.

Therefore, if the plurality of audio streams (see FIG. 2) includes therein dual mono audio stream in addition to AC-3 audio stream, the audio output in the AC-3 format may be switched to the audio output in the dual mono format, on the basis of the plurality of PU informations 302I, during the reproduction. Furthermore, in the case of dual mono audio stream, on the basis of the available channel data recorded in the ES map table, the "in-stream audio switching" allows to reproduce and output the main audio as two reproduction outputs for the L speaker and the R speaker, or to reproduce and output the sub-audio as these two reproduction outputs, or to reproduce and output the main audio for one speaker and the sub-audio for the other speaker, as these two reproduction outputs.

According to this embodiment as mentioned above, there is almost no need to distinct whether the stream switching or the in-stream audio switching is performed, as for the operation of the audio decoder 512 and the system controller 520 provided for the information record reproduction apparatus 500 (see FIG. 14). Furthermore, there is almost no need for the user to pay any special attention whether the stream switching or the in-stream audio switching is performed, so that the switching operation is done with the aid of the remote controller or the like, and the complicated user's operation due to two kinds of switching operations is almost avoided.

(Access Flow on Reproduction)

Next, with reference to FIG. 24, the access flow on reproduction by the information record reproduction apparatus 500, employing the AU information 132 and the PU information 302, is explained as one of the features of this embodiment, with the logical structure of the optical disc 100. FIG. 24 schematically illustrates an entire access flow on reproduction, in relation to the logical structure of the optical disc 100.

In FIG. 24, the logical structure of the optical disc 100 is categorized roughly into the following three hierarchies: a logic hierarchy 401; an object hierarchy 403; and a logic-object association hierarchy 402 mutually associating those two hierarchies.

Among them, the logic hierarchy 401 is a hierarchy for logically specifying various logical information to reproduce the desired title during the reproduction, as well as the playlist (P list) to be reproduced and its constitutional contents. In the logic hierarchy 401, disc information 110*d* indicating the entire titles 200 and the like on the optical disc 100 is written within the disc information file 110 (see FIG. 3), and further, reproduction sequence information 120*d* of the entire contents on the optical disc 100 is written within the playlist information file 120 (see FIG. 3). More specifically, the construction of one or more playlist sets 126S is written, as the reproduction sequence information 120*d*, respectively for one or more title elements 200-2 included in each title 200. Furthermore, each playlist set 126S includes one or more playlists 126, in each of which the construction of one or more items 204 (see FIG. 13) is written. Then, at the time of the access during the reproduction, the logic hierarchy 401 as described above specifies the title 200 to be reproduced, the playlist 126 corresponding to this, and further the item 204 corresponding to this.

Next, the logic-object association hierarchy 402 is a hierarchy for specifying the attribute and the physical storage address of the TS object data 140*d* to be reproduced, so as to specify the combination and/or the construction of the TS object data 140*d* as the entity data and to perform an address conversion to the object hierarchy 403 from the logic hierarchy 401, on the basis of the information specified in the logic hierarchy 401 as described above. More specifically, in the logic-object association hierarchy 402, the object information data 130*d*, which separates a group of the contents composing each item 204 into units of the AU 132 and which finely separates each AU 132 into units of the PU 302, is written in the object information file 130 (see FIG. 3).

Therefore, if the AU 132 to be reproduced is identified, and the PU's belonged to the AU are identified, the elementary stream to be reproduced is identified. That is, a desired elementary stream can be reproduced from the multi-recorded optical disc 100, without using the PAT or the PMT shown in FIG. 12.

The elementary stream to be actually reproduced herein is identified or designated by the ES_PID that is a packet ID (see FIG. 12) of the elementary stream, on the basis of the PU information 302. At the same time, the information indicating the start time point and the end time point of the reproduction is converted to the elementary stream address information, and thereby the contents in a specific area (or a specific time range) of a specific elementary stream is reproduced.

Thus, in the logic-object association hierarchy 402, an address conversion is performed from a logical address relating to each item 204 to a physical address relating to each PU 302.

Next, the object hierarchy 403 is a physical hierarchy to reproduce the actual TS object data 140*d*. In the object hierarchy 403, the TS object data 140*d* is written within the object data file 140 (see FIG. 3). More specifically, TS packets 146 constructing a plurality of elementary streams (ES) are multiplexed at every time point. The multiplexed packets are disposed on the time scale to thereby form a plurality of elementary streams (see FIG. 11). Then, a plurality of TS packets multiplexed at each time point is associated with a PU 302 identified by the logic-object association hierarchy 402, for each elementary stream. Incidentally, it is possible to associate a plurality of PU's 302 with one elementary stream. For example, it is possible to share one elementary stream relating to the same audio data or one elementary stream relating to the same sub-picture data, among a plurality of switchable programs.

Thus, in the object hierarchy 403, the object data is actually reproduced, using the physical address obtained from the conversion in the logic-object association hierarchy 402.

As described above, the three hierarchies shown in FIG. 24 allow making an access to the optical disc 100 during the reproduction.

As explained in detail with reference to FIG. 1 to FIG. 24, according to this embodiment, it is possible to perform the stream switching among the plurality of audio streams including dual mono audio stream, during the reproduction, with a relatively simple structure. Furthermore, it is possible to perform the in-stream audio switching in dual mono audio stream.

Incidentally, in the aforementioned embodiment, the explanation is made on the optical disc 100 as an example of the information record medium and the recorder or player of the optical disc 100 as an example of the information record reproduction apparatus. Nevertheless, the present invention is not limited to the optical disc and the player or recorder thereof, but is applicable to various record media and the recorders or players thereof, supporting other high density recording or high transfer rate.

The present invention is not limited to the above-described embodiments, and various changes may be made, if desired, without departing from the essence or spirit of the present invention which can be read from the claims and the entire specification. An information record medium, an apparatus for and a method of recording the information, an apparatus for and a method of reproducing the information, an apparatus for and a method of recording and reproducing the information, a computer program for controlling the record or the reproduction, and a data structure including a control signal, all of which involves such changes, are also intended to be within the technical scope of the present invention.

INDUSTRIAL APPLICABILITY

An information record medium, a apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

The invention claimed is:

1. An information record medium that is a computer-readable medium onto which a whole stream including a plurality of partial streams each composed of video information or audio information is multi-recorded by a packet unit that is a physically accessible unit, the video information or the audio information providing a series of content executable by a computer to control the computer to act as an information reproduction apparatus, said information record medium including:

an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by the information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information.

2. The information record medium according to claim 1, wherein the plural-channels stream comprises audio stream in a dual mono format in which the audio information is composed of main audio information and sub-audio information.

3. The information record medium according to claim 2, wherein
the plurality of partial streams includes, in addition to audio stream in the dual mono format, an audio stream in a predetermined format different from the dual mono format, and
the reproduction output group definition information defines the reproduction output group so that a reproduction output group to which the audio stream in the predetermined format belongs and a plurality of reproduction output groups to which audio stream in the dual mono format overlappingly belongs are switchable to each other.

4. The information record medium according to claim 1, wherein
the object information file further includes, as the reproduction control information, related group definition information to define, as a related group, a group of content having a special relationship from among a plurality of the series of content composing the plurality of partial streams, and
the reproduction output group definition information defines a group of partial streams switchable to each other in the related group, the group of partial streams being reproduced and outputted collectively, as the reproduction output group.

5. The information record medium according to claim 1, further comprising a reproduction sequence information file for storing reproduction sequence information to define a reproduction sequence of the object data stored in the object data file.

6. An information record apparatus for recording a whole stream including a plurality of partial streams each composed of video information or audio information onto an information record medium by a packet unit that is a physically accessible unit, the video information or the audio information providing a series of content, said information record apparatus comprising:
a first record device for recording an object data file for storing object data composed of a plurality of packets each storing pieces of the video information or the audio information and being a logically accessible unit; and
a second record device for recording an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein
the plurality of partial streams includes a plural-channels stream that is composed by recording the audio information for a plurality of channels overlappingly in one partial stream, and
the reproduction output group definition information includes channel designation information to designate at least one channel from among the plurality of channels, and an information on an access position to the partial stream corresponding to the channel designation information.

7. An information record method of recording a whole stream including a plurality of partial streams each composed of video information or audio information onto an information record medium by a packet unit that is a physically accessible unit, the video information or the audio information providing a series of content, said information record method comprising:
a first record process of recording an object data file for storing object data composed of a plurality of packets each storing pieces of the video information or the audio information and being a logically accessible unit; and
a second record process of recording an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein
the plurality of partial streams includes a plural-channels stream that is composed by recording the audio information for a plurality of channels overlappingly in one partial stream, and
the reproduction output group definition information includes channel designation information to designate at least one channel from among the plurality of channels, and an information on an access position to the partial stream corresponding to the channel designation information.

8. An information reproduction apparatus for reproducing at least a part of the recorded whole stream from a information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information, said information reproduction apparatus comprising:
a read device for reading information physically from the information record medium; and
a reproduction device for reproducing the object data, on the basis of the reproduction control information included in the information read by the read device, wherein, when the plurality of reproduction output groups to which the plural-channels stream overlappingly belongs is reproduced, the reproduction device selectively reproduces and outputs the audio information relating to the channel designated by the channel designation information.

9. An information reproduction method of reproducing at least a part of the recorded whole stream from a information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information, said information reproduction method comprising:

a read process of reading information physically from the information record medium; and a reproduction process of reproducing the object data, on the basis of the reproduction control information included in the information read by the read device, wherein, when the plurality of reproduction output groups to which the plural-channels stream overlappingly belongs is reproduced, the reproduction device selectively reproduces and outputs the audio information relating to the channel designated by the channel designation information.

10. An information record reproduction apparatus for recording the whole stream onto a information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, an information on an access position to the partial stream corresponding to the channel designation information, and reproducing at least a part of the recorded whole stream, said information record reproduction apparatus comprising:

a first record device for recording the object data file;

a second record device for recording the object information file;

a read device for reading information physically from the information record medium; and a reproduction device for reproducing the object data, on the basis of the reproduction control information included in the information read by the read device, wherein when the plurality of reproduction output groups to which the plural-channels stream overlappingly belongs is reproduced, the reproduction device selectively reproduces and outputs the audio information relating to the channel designated by the channel designation information.

11. An information record reproduction method of recording the whole stream onto a information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information, and reproducing at least a part of the recorded whole stream, said information record reproduction method comprising:

a first record process of recording the object data file;

a second record process of recording the object information file;

a read process of reading information physically from the information record medium; and a reproduction process of reproducing the object data, on the basis of the reproduction control information included in the information read by the read device, wherein when the plurality of reproduction output groups to which the plural-channels stream overlappingly belongs is reproduced, the reproduction device selectively reproduces and outputs the audio information relating to the channel designated by the channel designation information.

12. A computer program product in a physical record medium form, readable by a computer, for a record control to control the computer disposed at a information record apparatus for recording a whole stream including a plurality of partial streams each composed of video information or audio information onto an information record medium by a packet unit that is a physically accessible unit, the video information or the audio information providing a series of content, said information record apparatus comprising: a first record device for recording an object data file for storing object data composed of a plurality of packets each storing pieces of the video information or the audio information and being a logically accessible unit; and a second record device for recording an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information, said computer program product making the computer function as at least a part of the first record device and the second record device.

13. A computer program product in a physical record medium form, readable by a computer, for a reproduction control to control the computer disposed at a information reproduction apparatus for reproducing at least a part of the recorded whole stream from the information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, and an information on an access position to the partial stream corresponding to the channel designation information, said information reproduction apparatus comprising: a read device for reading information physically from the information record medium; and a reproduction device for reproducing the object data, on the basis of the reproduction control information included in the information read by the read device, wherein, when the plurality of reproduction output groups to which the plural-channels stream overlappingly belongs is reproduced, the reproduction device selectively reproduces and outputs the audio information relating to the channel designated by the channel designation information, said computer program product making the computer function as at least a part of the read device and the reproduction device.

14. A computer program product in a physical record medium form, readable by a computer, for a record reproduction control to control the computer disposed at a information record reproduction apparatus for recording the whole stream onto the information record medium onto which a whole stream including a plurality of partial streams each composed of video information or audio information is multi-recorded by a packet unit that is a physically accessible unit, the video information or the audio information providing a series of content, said information record medium including: an object data file for storing object data composed of a plurality of packets each storing pieces of the video information or the audio information and being a logically accessible unit; and an object information file for storing, as reproduction control information to control a reproduction of the object data file, (i) relationship definition information to define a relationship between a plurality of packets to be multiplexed on a time axis and the plurality of partial streams, and (ii) reproduction output group definition information to define a group of partial streams switchable to each other by an information reproduction apparatus from among the plurality of partial streams, the group being reproduced and outputted collectively, as a reproduction output group, wherein the plurality of partial streams includes a plural-channels stream that is composed by recording the audio information for a plurality of channels overlappingly in one partial stream, and the reproduction output group definition information includes channel designation information to designate at least one channel from among the plurality of channels, an information on an access position to the partial stream corresponding to the channel designation information, and reproducing at least a part of the recorded whole stream, said information record reproduction apparatus comprising: a first record device for recording the object data file; a second record device for recording the object information file; a read device for reading information physically from the information record medium; and a reproduction device for reproducing the object data, on the basis of the reproduction control information included in the information read by the read device, wherein when the plurality of reproduction output groups to which the plural-channels stream overlappingly belongs is reproduced, the reproduction device selectively reproduces and outputs the audio information relating to the channel designated by the channel designation information, said computer program product making the computer function as at least a part of the first record device, the second record device, the read device and the reproduction device.

15. The information recording medium according to claim 1, wherein said computer-readable medium is one of a ROM, a CD-ROM, a DVD-ROM, and a hard disk unto which the whole stream is multi-recorded.

16. The computer program product of claim 12, wherein the product is in the physical form of one of a ROM, a CD-ROM, a DVD-ROM, and a hard drive.

17. The computer program product of claim 13, wherein the product is in the physical form of one of a ROM, a CD-ROM, a DVD-ROM, and a hard drive.

18. The computer program product of claim 14, wherein the product is in the physical form of one of a ROM, a CD-ROM, a DVD-ROM, and a hard drive.

* * * * *